(12) United States Patent
Batycky et al.

(10) Patent No.: US 12,458,615 B2
(45) Date of Patent: Nov. 4, 2025

(54) METHODS FOR PROVIDING RAPID RELIEF OF MOTOR FLUCTUATIONS IN A PARKINSON'S DISEASE PATIENT

(71) Applicant: Merz Pharmaceuticals, LLC, Raleigh, NC (US)

(72) Inventors: Richard P. Batycky, Newton, MA (US); Michael M. Lipp, Framingham, MA (US); Martin Freed, Wellesley, MA (US)

(73) Assignee: Merz Pharmaceuticals, LLC, Raleigh, NC (US)

( * ) Notice: Subject to any disclaimer, the term of this patent is extended or adjusted under 35 U.S.C. 154(b) by 0 days.

(21) Appl. No.: 18/949,037

(22) Filed: Nov. 15, 2024

(65) Prior Publication Data
US 2025/0248960 A1    Aug. 7, 2025

Related U.S. Application Data

(63) Continuation of application No. 18/593,291, filed on Mar. 1, 2024, now abandoned, which is a continuation of application No. 18/223,123, filed on Jul. 18, 2023, now abandoned, which is a continuation of application No. 18/076,575, filed on Dec. 7, 2022, now abandoned, which is a continuation of application No. 17/736,208, filed on May 4, 2022, now abandoned, which is a continuation of application No. 17/482,603, filed on Sep. 23, 2021, now abandoned, which is a continuation of application No. 17/173,564, filed on Feb. 11, 2021, now abandoned, which is a continuation of application No. 16/922,276, filed on Jul. 7, 2020, now abandoned, which is a continuation of application No. 16/688,274, filed on Nov. 19, 2019, now abandoned, which is a continuation of application No. 16/377,496, filed on Apr. 8, 2019, now abandoned, which is a continuation of application No. 16/114,434, filed on Aug. 28, 2018, now abandoned, which is a continuation of application No. 15/801,665, filed on Nov. 2, 2017, now abandoned, which is a continuation of application No. 14/691,793, filed on Apr. 21, 2015, now abandoned, which is a continuation of application No. PCT/US2013/065838, filed on Oct. 21, 2013.

(60) Provisional application No. 61/813,725, filed on Apr. 19, 2013, provisional application No. 61/813,605, filed on Apr. 18, 2013, provisional application No. 61/716,740, filed on Oct. 22, 2012.

(51) Int. Cl.
| | | |
|---|---|---|
| A61K 31/198 | (2006.01) | |
| A61K 9/00 | (2006.01) | |
| A61K 31/197 | (2006.01) | |
| A61K 45/06 | (2006.01) | |
| A61K 9/16 | (2006.01) | |

(52) U.S. Cl.
CPC ............ *A61K 31/198* (2013.01); *A61K 9/007* (2013.01); *A61K 31/197* (2013.01); *A61K 45/06* (2013.01); *A61K 9/0075* (2013.01); *A61K 9/0078* (2013.01); *A61K 9/008* (2013.01); *A61K 9/1617* (2013.01)

(58) Field of Classification Search
CPC .................................................... A61K 31/198
USPC ........................................................ 514/565
See application file for complete search history.

(56) References Cited

U.S. PATENT DOCUMENTS

| | | |
|---|---|---|
| 7,160,913 B2 | 1/2007 | Schneider et al. |
| 7,556,798 B2 | 7/2009 | Edwards et al. |
| 7,879,358 B2 | 2/2011 | Jackson et al. |
| RE43,711 E | 10/2012 | Bennett et al. |
| 8,283,380 B2 | 10/2012 | Fariello et al. |
| 8,399,513 B2 | 3/2013 | Karaborni et al. |
| 8,404,276 B2 | 3/2013 | Bennett et al. |
| 8,545,878 B1 | 10/2013 | Kee et al. |
| 8,685,442 B1 | 4/2014 | Batycky et al. |
| 8,703,809 B2 | 4/2014 | Gomez-Mancilla et al. |
| 9,295,661 B2 | 3/2016 | Batycky et al. |
| 2002/0035993 A1 | 3/2002 | Edwards et al. |
| 2002/0058009 A1 | 5/2002 | Bartus et al. |
| 2004/0018989 A1 | 1/2004 | Jackson et al. |
| 2011/0151008 A1 | 6/2011 | Jackson et al. |

(Continued)

FOREIGN PATENT DOCUMENTS

| | | |
|---|---|---|
| GB | 2454480 A | 5/2009 |
| RU | 2342929 C2 | 1/2009 |

(Continued)

OTHER PUBLICATIONS

*Glaverbel SA v. British Coal Corp. and another* [1995] RPC 255.

(Continued)

*Primary Examiner* — Raymond J Henley, III
(74) *Attorney, Agent, or Firm* — Elmore Patent Law Group, P.C.; Joseph C. Zucchero; Carolyn S. Elmore

(57) ABSTRACT

The present invention provides methods of providing rapid relief of motor fluctuations in a Parkinson's disease patient. The methods of the invention comprise pulmonary administration of levodopa by inhalation at therapeutically effective concentrations such that the patient's plasma levodopa concentration increases by at least about 200 ng/ml within 10 minutes or less post inhalation as compared to the concentration of levodopa in the patient's plasma prior to inhalation of the levodopa and wherein the patient's plasma concentration remains increased by at least about 200 ng/ml for a time period of at least 15 minutes after inhalation. The methods of the invention are particularly useful for treatment of motor fluctuations which arise as a result of poorly controlled levodopa plasma levels in a patient.

18 Claims, 9 Drawing Sheets

(56) References Cited

U.S. PATENT DOCUMENTS

| | | |
|---|---|---|
| 2013/0287854 A1 | 10/2013 | Morgan et al. |
| 2015/0328175 A1 | 11/2015 | Batycky et al. |

FOREIGN PATENT DOCUMENTS

| | | |
|---|---|---|
| WO | 03079992 A2 | 10/2003 |
| WO | 2014066206 A1 | 5/2014 |
| WO | 2014066208 A1 | 5/2014 |
| WO | 2014074795 A1 | 5/2014 |
| WO | 2014074797 A1 | 5/2014 |

OTHER PUBLICATIONS

Lonza Ltd [2020] NZIPOPAT 1.

Taiho Pharmaceutical Co., Ltd. [2020] NZIPOPAT 5.

"Efficacy and Safety Study of Inhaled CVT 301 in Parkinson's Disease Patients for Treatment of Off Episodes", ClinicalTrials.gov Archive: NCT01777555, Apr. 3, 2014. Retrieved from the Internet: https://clinicaltrials.gov/ct2/show/NCT01777555.

Anonymous, "CVT-inhaled levodopa for the treatment of Parkinson's disease—Civitas Therapeutics Announces Positive Phase 2b Results for CVT-301, Inhaled Levodopa for the Treatment of Parkinson's Disease", Apr. 28, 2014, Retrieved from the Internet: URL:http://www.fh-partners.com/news-entries/2014/4/28/civitas-therapeutics-announces-positive-phase-2b-results-for-cvt-301-inhaled-levodopa-for-the-treatment-of-parkinsans-disease [retrieved on Nov. 9, 2017], 1-7.

Anonymous, "Inhaled Levodopa as a Treatment for Intermittent Motor Fluctuations in Parkinson's Disease", Mar. 1, 2014 (Mar. 1, 2014) Retrieved from the Internet: URL:https://www.michaeljfox.org/foundation/grant-detail.php?grantid=1176 [retrieved on Nov. 9, 2017], 1-2.

Anonymous, "Safety, Pharmacokinetics and Efficacy Study of CVT-301 Inpatients With Parkinson's Disease and "Off" Episodes", ClinicalTrials.gov Archive, Jun. 13, 2013, Retrieved from the Internet: URL:https://clinicaltrials.gov/archive/NCT01617135 [retrieved on—Nov. 9, 2017], 1-3.

Bartus, et al., "A Pulmonary Formulation of L-Dopa Enhances its Effectiveness in a Rat 1-63 model of Parkinson's Disease", Journal of Pharmacology and Experimental Therapeutics, vol. 310(2), DOI: 10.1124/jpet.103.064121, Jan. 1, 2004, 828-835.

Freed, et al., "Dry Powder-Based Delivery of Intrapulmonary Levodopa as a Treatment for Motor Fluctuations in Parkinson's Disease", available from https://www.michaeljfox.org/grant/dry-powder-based-deliveryintrapulmonary-levodopa-treatment-motor-fluctuations-parkinsons; as viewed on Jun. 20, 2012.

Freed, et al., "Rapid Levodopa Augmentation Following Inhaled CVT-301 Results in Rapid Improvement in Motor Response When Administered to PD Patients in the Off State", Neurology, 82(10), https://n.neurology.org/content/82/10_Supplement/S7.007, Apr. 8, 2014, Supp S7.007.

Hardie, et al., "The Pharmacokinetics of Intravenous and Oral Levodopa fn Patients with 27-28 Parkinson's Disease who Exhibit On-Off Fluctuations", British Journal of Clinical Pharmacology, 22(4), Oct. 1, 1986, 429-443.

Herpich, N., "A Breath of Relief: Inhaled Formulation of Levodopa Reduces 'Off' Periods in People with Parkinson's", Foxfeed Blog, Retrieved from the Internet: URL:https://www.michaeljfox.org/foundation/news-detail.php?breath-of-relief-inhaledformulation-of-levodopa-reduces-off-periods-in-people-with-parkinson [retrieved on Nov. 9, 2017], 1-2.

Lewitt, et al., "Pulmonary Safety and Tolerability of Inhaled Levodopa (CVT-301) Administered to Patients with Parkinson's Disease", Journal of Aerosol Medicine and Pulmonary Drug Delivery, vol. 31 (3), 2018, 155-161.

Not Provided, Jiten, vol. 45, No. 5, 2002, 381-384.

Not Provided, Drug Delivery System, vol. 20, No. 6, 2005, 610-619.

Not Provided, Brain Nursing, vol. 24, No. 6, 2008, 57-64.

Not Provided, Journal of the Showa Medical Association, vol. 69, No. 1, 2009, 19-23.

Not Provided, Geriatric Medicine, 41(10), Oct. 2003, 1531-1534.

Okereke, C.S., "Role of integrative pharmacokinetic and pharmacodynamic optimization strategy in the management of Parkinson's disease patients experiencing motor fluctuations with l evodopa", J. Pharm. Pharm. Sci., 5(2), May-Aug. 2002, 146-161.

Pereira, et al., "Levodopa microparticles for pulmonary delivery: photodegradation kinetics and LC stability-indicating method", Pharmazie.;67(7):, abstract, found on Apr. 20, 2018 from PubMed PMID:22888517, Jul. 2012, 605-610.

Swope, D.M., "Rapid Treatment of 'Wearing Off' in Parkinson's Disease", Neurology, 62(6 Suppl 4), DOI: 10.1212/wnl.62.6_suppl_4.s27, Mar. 23, 2004, S27-31.

Examination Report for OEE application No. EP 13849388.7, dated Dec. 6, 2020.

METHODS FOR PROVIDING RAPID RELIEF OF MOTOR FLUCTUATIONS IN A PARKINSON'S DISEASE PATIENT

RELATED APPLICATIONS

This application is a continuation of U.S. application Ser. No. 18/593,291, filed Mar. 1, 2024, which is a continuation of U.S. application Ser. No. 18/223,123, filed Jul. 18, 2023, now abandoned, which is a continuation of U.S. application Ser. No. 18/076,575, filed Dec. 7, 2022, now abandoned, which is a continuation of U.S. application Ser. No. 17/736,208, filed May 4, 2022, now abandoned, which is a continuation of U.S. application Ser. No. 17/482,603, filed Sep. 23, 2021, now abandoned, which is a continuation of U.S. application Ser. No. 17/173,564, filed Feb. 11, 2021, now abandoned, which is a continuation of U.S. application Ser. No. 16/922,276, filed Jul. 7, 2020, now abandoned, which is a continuation of U.S. application Ser. No. 16/688,274, filed Nov. 19, 2019, now abandoned, which is a continuation of U.S. application Ser. No. 16/377,496, filed Apr. 8, 2019, now abandoned, which is a continuation of U.S. application Ser. No. 16/114,434, filed Aug. 28, 2018, now abandoned, which is a continuation of U.S. application Ser. No. 15/801,665, filed Nov. 2, 2017, now abandoned, which is a continuation of U.S. application Ser. No. 14/691,793, filed Apr. 21, 2015, now abandoned, which is a continuation of International Application No. PCT/US13/65838 which designated the United States and was filed on Oct. 21, 2013, published in English, which claims the benefit of U.S. Provisional Application Nos. 61/716,740, filed Oct. 22, 2012; 61/813,605, filed Apr. 18, 2013 and 61/813,725, filed Apr. 19, 2013. The entire teachings of the above applications are incorporated herein by reference.

BACKGROUND OF THE INVENTION

Parkinson's disease is characterized neuropathologically by degeneration of dopamine neurons in the basal ganglia and neurologically by debilitating tremors, slowness of movement and balance problems. It is estimated that over one million people suffer from Parkinson's disease. Nearly all patients receive the dopamine precursor levodopa or "L-Dopa", often in conjunction with the dopa-decarboxylase inhibitor, carbidopa. L-Dopa adequately controls symptoms of Parkinson's disease in the early stages of the disease. However, it tends to become less effective after a period which can vary from several months to several years in the course of the disease.

One example of L-Dopa's diminishing effectiveness is the development of motor fluctuations in a subject undergoing treatment. By "motor fluctuations" it is meant that a subject begins to show a variable response to dopamine replacement therapy such that for periods of time the therapeutic agents exhibit good efficacy whereas for other periods of time the agents appear to have little effect. Motor fluctuations can manifest as a 'wearing-off' of efficacy, the efficacy of L-Dopa therapy does not last as long as initially observed, and an 'on-off' syndrome where the patient experiences disabling fluctuations in mobility ensues. Gradually, over a period of time, the efficacy of L-Dopa (so called "on-time") may be reduced to the extent that the usefulness of dopaminergic treatments becomes severely limited.

It is believed that the varying effects of L-Dopa in Parkinson's disease patients are related, at least in part, to the plasma half life of L-Dopa which tends to be very short, in the range of 1 to 3 hours, even when co-administered with carbidopa. In the early stages of the disease, this factor is mitigated by the dopamine storage capacity of the targeted striatal neurons. L-Dopa is taken up and stored by the neurons and is released over time. However, as the disease progresses, dopaminergic neurons degenerate, resulting in decreased dopamine storage capacity.

Accordingly, the positive effects of L-Dopa become increasingly related to fluctuations of plasma levels of L-Dopa. In addition, patients tend to develop problems involving gastric emptying and poor intestinal uptake of L-Dopa. Erratic gastric emptying of levodopa contributes to random fluctuations in mobility. Patients exhibit increasingly marked swings in Parkinson's disease symptoms, ranging from a return to classic Parkinson's disease symptoms, when plasma levels fall, to the so-called dyskinesis, when plasma levels temporarily rise too high following L-Dopa administration.

There remains a need to provide rapid relief of motor fluctuations in a Parkinson's patient where that effect occurs in a clinically meaningful period of time and where the effect allows the patient sufficient duration of response.

SUMMARY OF THE INVENTION

The present invention provides methods of providing rapid relief of motor fluctuations in a Parkinson's disease patient while also providing an extended duration of effect. The methods of the invention comprise pulmonary administration of levodopa by inhalation at therapeutically effective concentrations such that the patient's plasma levodopa concentration increases by at least about 200 ng/ml within 10 minutes or less post inhalation as compared to the concentration of levodopa in the patient's plasma prior to inhalation of the levodopa and wherein the patient's plasma concentration remains increased by at least about 200 ng/ml for a time period of at least 15 minutes after inhalation. The methods of the invention are particularly useful for treatment of motor fluctuations which arise as a result of poorly controlled levodopa plasma levels in a patient.

DETAILED DESCRIPTION OF THE INVENTION

Definitions

Figure 1:
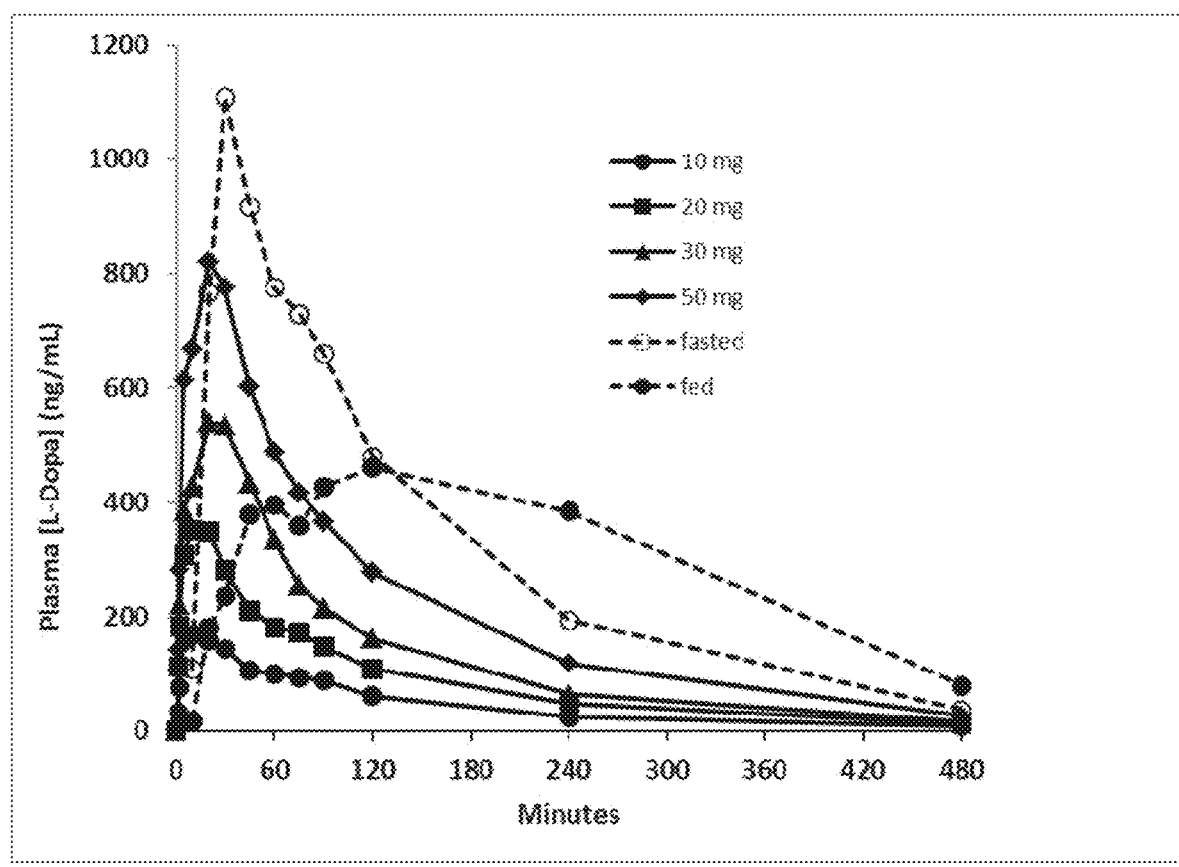
FIG. 1: Mean plasma levodopa concentration vs. time data following 90/8/2 inhalation and oral levodopa administration.

The half-life time ($T_{1/2}$) is the time for a concentration (C) of a drug in a body fluid or a tissue to reach the concentration C/2.

"$Cmax^{Pul}$" means the maximum observed plasma concentration (Cmax) as measured after pulmonary delivery. "$Cmax^{oral}$" means the maximum observed plasma concentration as measured after oral delivery.

The area under the curve, AUC, corresponds to the integral of the plasma concentration over a given time interval. The AUC is expressed in units of mass (mg, g)×liter−1×hour, and is a measure of the bioavailability of a drug.

"$AUC^{Pul}$" means the area under the plasma concentration versus time curve (AUC) as measured after pulmonary delivery. "$AUC^{oral}$" means the area under the plasma concentration versus time curve (AUC) as measured after oral delivery.

The term "coefficient of variation" (CV) which is expressed as % CV, is defined as the ratio of the standard deviation σ to the mean μ:

$$C_v = \sigma/\mu$$

As used herein, the phrase "nominal dose" or "nominal powder dose" means the percentage of levodopa which is present in the total mass of particles contained in the receptacle and represents the maximum amount of levodopa available for administration to the patient.

The fine particle fraction" or "FPF" corresponds to the percentage of particles in the mass of particles present in the receptacle that have an aerodynamic diameter of less than 5.6 μm.

The term "fine particle dose" as used herein is defined as the nominal dose multiplied by the FPF.

List of Abbreviations

| | |
|---|---|
| A | y-axis intercept for distribution phase |
| α | Distribution phase rate constant |
| AUC | Area under the plasma concentration versus time curve |
| $AUC_{0-t}$ | AUC from time 0 to last measureable plasma concentration |
| $AUC_{0-\infty}$ | AUC from time 0 to infinity |
| $AUC_{0-10\,m}$ | AUC from time 0 to 10 minutes |
| B | y-axis intercept for elimination phase |
| β | Elimination phase rate constant |
| BLQ | Below Level of Quantitation (of the assay) |
| C | y-axis intercept for absorption phase |
| CD/LD | Carbidopa/levodopa |
| CL/F | Clearance divided by fraction of drug absorbed |
| $C_{max}$ | Maximum observed plasma drug concentration |
| $C_{max,\,10\,m}$ | $C_{max}$ observed in first 10 minutes |
| FPD | Fine particle dose |
| K01 | Absorption rate constant |
| K10 | Elimination rate constant, PK model |
| K12 | Inter-compartmental rate constant, compartment 1->2 |
| K21 | Inter-compartmental rate constant, compartment 2->1 |
| λ | Elimination rate constant |
| LD | Levodopa |
| L-Dopa | Levodopa |
| mg | Milligrams |
| min | Minutes |
| mL | Milliliters |
| NC | Not calculated |
| NCA | Non-compartmental PK analysis |
| ng | Nanograms |
| NS | No sample |
| PD | Parkinson's disease |
| PK | Pharmacokinetic |
| $T_{1/2}$ | Terminal half-life |
| $T_{1/2\alpha}$ | Half-life of distribution phase |
| $T_{1/2\beta}$ | Half-life of elimination phase |
| $T_{1/2k01}$ | Absorption half-life |
| $T_{lag}$ | Lag time |
| $T_{max}$ | Time to maximum observed plasma drug concentration |
| $T_{Cmax50}$ | Time to reach 50% of $C_{max}$ |
| Vz/F | Volume of distribution divided by fraction of drug absorbed |

The features and other details of the invention will now be more particularly described and pointed out in the claims. It will be understood that the particular embodiments of the invention are shown by way of illustration and not as limitations of the invention. The principle features of this invention may be employed in various embodiments without departing from the scope of the invention. As used herein and in the appended claims, the singular forms "a", "an", and "the" include plural referents unless the context clearly dictates otherwise.

In accordance with the invention, a "dose of levodopa", as that term is used herein means a formulation comprising an amount of levodopa in a dosage form suitable for delivery to a patient by inhalation. In one embodiment, a dose of levodopa in accordance with the invention comprises particles containing levodopa. Particles and methods for delivering levodopa to the respiratory system are described, for example, in U.S. Pat. No. 6,514,482 and U.S. Pat. Reissue No. RE43711, the contents of both are incorporated herein by reference in their entirety. The particles are preferably in the form of a dry powder and are characterized by a fine particle fraction (FPF), geometric and aerodynamic dimensions and by other properties, as further described below.

Gravimetric analysis, using Cascade impactors, is a method of measuring the size distribution of airborne particles. The Andersen Cascade Impactor (ACI) is an eight-stage impactor that can separate aerosols into nine distinct fractions based on aerodynamic size. The size cutoffs of each stage are dependent upon the flow rate at which the ACI is operated. Preferably the ACI is calibrated at 60 L/min.

In one embodiment, a two-stage collapsed ACI is used for particle optimization. The two-stage collapsed ACI consists of stages 0, 2 and F of the eight-stage ACI and allows for the collection of two separate powder fractions. At each stage an aerosol stream passes through the nozzles and impinges upon the surface. Particles in the aerosol stream with a large enough inertia will impact upon the plate. Smaller particles that do not have enough inertia to impact on the plate will remain in the aerosol stream and be carried to the next stage.

The ACI is calibrated so that the fraction of powder that is collected on a first stage is referred to as fine particle fraction FPF (5.6). This FPF corresponds to the % of particles that have an aerodynamic diameter of less than 5.6 μm. The fraction of powder that passed the first stage of the ACI and is deposited on the collection filter is referred to as FPF (3.4). This corresponds to the % of particles having an aerodynamic diameter of less than 3.4 μm.

The FPF (5.6) fraction has been demonstrated to correlate to the fraction of the powder that is deposited in the lungs of the patient, while the FPF (3.4) has been demonstrated to correlate to the fraction of the powder that reaches the deep lung of a patient.

The FPF of at least 50% of the particles of the invention is less than about 5.6 µm. For example, but not limited to, the FPF of at least 60%, or 70%, or 80%, or 90% of the particles is less than about 5.6 µm.

Another method for measuring the size distribution of airborne particles is the multi-stage liquid impinger (MSLI). The Multi-stage liquid Impinger (MSLI) operates on the same principles as the Anderson Cascade Impactor (ACI), but instead of eight stages there are five in the MSLI. Additionally, instead of each stage consisting of a solid plate, each MSLI stage consists of a methanol-wetted glass frit. The wetted stage is used to prevent bouncing and re-entrainment, which can occur using the ACI. The MSLI is used to provide an indication of the flow rate dependence of the powder. This can be accomplished by operating the MSLI at 30, 60, and 90 L/min and measuring the fraction of the powder collected on stage 1 and the collection filter. If the fractions on each stage remain relatively constant across the different flow rates then the powder is considered to be approaching flow rate independence.

The particles of the invention have a tap density of less than about 0.4 g/cm³. Particles which have a tap density of less than about 0.4 g/cm³ are referred to herein as "aerodynamically light particles". For example, the particles have a tap density less than about 0.3 g/cm³, or a tap density less than about 0.2 g/cm³, a tap density less than about 0.1 g/cm³. Tap density can be measured by using instruments known to those skilled in the art such as the Dual Platform Microprocessor Controlled Tap Density Tester (Vankel, NC) or a GEOPYC™ instrument (Micrometrics Instrument Corp., Norcross, GA 30093). Tap density is a standard measure of the envelope mass density. Tap density can be determined using the method of USP Bulk Density and Tapped Density, United States Pharmacopia convention, Rockville, MD, $10^{th}$ Supplement, 4950-4951, 1999. Features which can contribute to low tap density include irregular surface texture and porous structure.

The envelope mass density of an isotropic particle is defined as the mass of the particle divided by the minimum sphere envelope volume within which it can be enclosed. In one embodiment of the invention, the particles have an envelope mass density of less than about 0.4 g/cm³.

The particles of the invention have a preferred size, e.g., a volume median geometric diameter (VMGD) of at least about 1 micron (µm). In one embodiment, the VMGD is from about 1 µm to 30 µm, or any subrange encompassed by about 1 µm to 30 µm, for example, but not limited to, from about 5 µm to about 30 µm, or from about 10 µm to 30 µm. For example, the particles have a VMGD ranging from about 1 µm to 10 µm, or from about 3 µm to 7 µm, or from about 5 µm to 15 µm or from about 9 µm to about 30 µm. The particles have a median diameter, mass median diameter (MMD), a mass median envelope diameter (MMED) or a mass median geometric diameter (MMGD) of at least 1 µm, for example, 5 µm or near to or greater than about 10 µm. For example, the particles have a MMGD greater than about 1 µm and ranging to about 30 µm, or any subrange encompassed by about 1 µm to 30 µm, for example, but not limited to, from about 5 µm to 30 µm or from about 10 µm to about 30 µm.

The diameter of the spray-dried particles, for example, the VMGD, can be measured using a laser diffraction instrument (for example Helos, manufactured by Sympatec, Princeton, NJ). Other instruments for measuring particle diameter are well known in the art. The diameter of particles in a sample will range depending upon factors such as particle composition and methods of synthesis. The distribution of size of particles in a sample can be selected to permit optimal deposition to targeted sites within the respiratory tract.

Aerodynamically light particles preferably have "mass median aerodynamic diameter" (MMAD), also referred to herein as "aerodynamic diameter", between about 1 µm and about 5 µm or any subrange encompassed between about 1 µm and about 5 µm. For example, the MMAD is between about 1 µm and about 3 µm, or the MMAD is between about 3 µm and about 5 µm.

Experimentally, aerodynamic diameter can be determined by employing a gravitational settling method, whereby the time for an ensemble of particles to settle a certain distance is used to infer directly the aerodynamic diameter of the particles. An indirect method for measuring the mass median aerodynamic diameter (MMAD) is the multi-stage liquid impinger (MSLI).

The aerodynamic diameter, $d_{aer}$, can be estimated from the equation:

$$d_{aer} = d_g \sqrt{\rho_{tap}}$$

where $d_g$ is the geometric diameter, for example the MMGD, and $\rho$ is the powder density.

Particles which have a tap density less than about 0.4 g/cm³, median diameters of at least about 1 µm, for example, at least about 5 µm, and an aerodynamic diameter of between about 1 µm and about 5 µm, preferably between about 1 µm and about 3 µm, are more capable of escaping inertial and gravitational deposition in the oropharyngeal region, and are targeted to the airways, particularly the deep lung. The use of larger, more porous particles is advantageous since they are able to aerosolize more efficiently than smaller, denser aerosol particles such as those currently used for inhalation therapies.

In comparison to smaller, relatively denser particles the larger aerodynamically light particles, preferably having a median diameter of at least about 5 µm, also can potentially more successfully avoid phagocytic engulfment by alveolar macrophages and clearance from the lungs, due to size exclusion of the particles from the phagocytes' cytosolic space. Phagocytosis of particles by alveolar macrophages diminishes precipitously as particle diameter increases beyond about 3 µm. Kawaguchi, H., et al., *Biomaterials*, 7: 61-66 (1986); Krenis, L. J. and Strauss, B., *Proc. Soc. Exp. Med.*, 107: 748-750 (1961); and Rudt, S. and Muller, R. H., *J. Contr. Rel.*, 22: 263-272 (1992). For particles of statistically isotropic shape, such as spheres with rough surfaces, the particle envelope volume is approximately equivalent to the volume of cytosolic space required within a macrophage for complete particle phagocytosis.

The particles may be fabricated with the appropriate material, surface roughness, diameter and tap density for localized delivery to selected regions of the respiratory tract such as the deep lung or upper or central airways. For example, higher density or larger particles may be used for upper airway delivery, or a mixture of varying sized particles in a sample, provided with the same or different therapeutic agent may be administered to target different regions of the lung in one administration. Particles having an aerodynamic diameter ranging from about 3 to about 5 µm are preferred for delivery to the central and upper airways. Particles having and aerodynamic diameter ranging from about 1 to about 3 µm are preferred for delivery to the deep lung.

Inertial impaction and gravitational settling of aerosols are predominant deposition mechanisms in the airways and acini of the lungs during normal breathing conditions. Edwards, D. A., *J. Aerosol Sci.*, 26: 293-317 (1995). The importance of both deposition mechanisms increases in proportion to the mass of aerosols and not to particle (or envelope) volume. Since the site of aerosol deposition in the lungs is determined by the mass of the aerosol (at least for particles of mean aerodynamic diameter greater than approximately 1 µm), diminishing the tap density by increasing particle surface irregularities and particle porosity permits the delivery of larger particle envelope volumes into the lungs, all other physical parameters being equal.

The low tap density particles have a small aerodynamic diameter in comparison to the actual envelope sphere diameter. The aerodynamic diameter, $d_{aer}$, is related to the envelope sphere diameter, d (Gonda, I., "Physico-chemical principles in aerosol delivery," in *Topics in Pharmaceutical Sciences* 1991 (eds. D. J. A. Crommelin and K. K. Midha), pp. 95-117, Stuttgart: Medpharm Scientific Publishers, 1992)), by the simplified formula:

$$d_{aer} = d\sqrt{\rho}$$

where the envelope mass density is in units of g/cm³.

Maximal deposition of monodispersed aerosol particles in the alveolar region of the human lung (~60%) occurs for an acrodynamic diameter of approximately $d_{aer}$=3 µm. Heyder, J. et al., *J. Aerosol Sci.*, 17: 811-825 (1986). Due to their small envelope mass density, the actual diameter d of aerodynamically light particles comprising a monodisperse inhaled powder that will exhibit maximum deep-lung deposition is:

$$d = 3/\sqrt{\rho}\,\mu m \text{ (where } \rho < 1 \text{ g/cm}^3\text{)};$$

where d is always greater than 3 µm. For example, aerodynamically light particles that display an envelope mass density, $\mu$=0.1 g/cm³, will exhibit a maximum deposition for particles having envelope diameters as large as 9.5 µm. The increased particle size diminishes interparticle adhesion forces. Visser, J., *Powder Technology*, 58: 1-10. Thus, large particle size increases efficiency of aerosolization to the deep lung for particles of low envelope mass density, in addition to contributing to lower phagocytic losses.

The aerodynamic diameter can be calculated to provide for maximum deposition within the lungs. Previously this was achieved by the use of very small particles of less than about five microns in diameter, preferably between about one and about three microns, which are then subject to phagocytosis. Selection of particles which have a larger diameter, but which are sufficiently light (hence the characterization "aerodynamically light"), results in an equivalent delivery to the lungs, but the larger size particles are not phagocytosed. Improved delivery can be obtained by using particles with a rough or uneven surface relative to those with a smooth surface.

In another embodiment of the invention, the particles have an envelope mass density, also referred to herein as "mass density" of less than about 0.4 g/cm³. In some embodiments, the particle density is about 0.01, 0.02, 0.03, 0.04, 0.05, 0.06, 0.07, 0.08, 0.09, less than 0.1, from 0.02 to 0.05, from 0.02 to 0.06 g/cm³. Mass density and the relationship between mass density, mean diameter and aerodynamic diameter are discussed in U.S. Pat. No. 6,254,854, issued on Jul. 3, 2001, to Edwards, et al., which is incorporated herein by reference in its entirety.

Particles that have compositions and acrodynamic properties described above may be produced by several methods including, but not limited to spray drying. Generally, spray-drying techniques are described, for example, by K. Masters in "Spray Drying Handbook", John Wiley & Sons, New York, 1984.

As used herein, the term "effective amount" or "therapeutically effective amount" means the amount needed to achieve the desired effect or efficacy. The actual effective amounts of drug can vary according to the specific drug or combination thereof being utilized, the particular composition formulated, the mode of administration, and the age, weight, condition of the patient, and severity of the episode being treated. In the case of a dopamine precursor, agonist or combination thereof it is an amount which reduces the Parkinson's symptoms which require therapy. Dosages for a particular patient are described herein and can be determined by one of ordinary skill in the art using conventional considerations, (e.g. by means of an appropriate, conventional pharmacological protocol).

Administration of particles to the respiratory system can be by means such as known in the art. For example, particles are delivered from an inhalation device such as a dry powder inhaler (DPI). Metered-dose-inhalers (MDI), nebulizers or instillation techniques also can be employed.

In one embodiment delivery to the pulmonary system of particles is by the methods described in U.S. Pat. No. 6,858,199 entitled, "High Efficient Delivery of a Large Therapeutic Mass Aerosol", and U.S. Pat. No. 7,556,798, entitled "Highly Efficient Delivery of a Large Therapeutic Mass Aerosol". The entire contents of both these patents are incorporated herein by reference. As disclosed therein, particles are held, contained, stored or enclosed in a receptacle. The receptacle, e.g. capsule or blister has a volume of at least about 0.37 cm³ and can have a design suitable for use in a dry powder inhaler. Larger receptacles having a volume of at least about 0.48 cm³, 0.67 cm³ or 0.95 cm³ also can be employed. As used herein, the term "receptacle" includes but is not limited to, for example, a capsule, blister, film covered container well, chamber and other suitable means of storing particles, a powder or a respirable composition in an inhalation device known to those skilled in the art. In one embodiment, the receptacles are capsules, for example, capsules designated with a particular capsule size, such as 2, 1, 0, 00 or 000. Suitable capsules can be obtained, for example, from Shionogi (Rockville, MD). In one embodiment, the capsule shell may comprise hydroxypropyl methylcellulose (HPMC). In a further embodiment, the capsule shell may comprise hydroxypropyl methylcellulose (HPMC) and titanium dioxide. Blisters can be obtained, for example, from Hueck Foils, (Wall, NJ). Other receptacles and other volumes thereof suitable for use in the instant invention are known to those skilled in the art.

In one embodiment, the invention provides administering L-Dopa to the pulmonary system in a small number of steps, and preferably in a single, breath activated step. In one embodiment, at least 50% of the mass of the particles stored in the inhaler receptacle is delivered to a subject's respiratory system in a single, breath-activated step. In one embodiment at least 60%, preferably at least 70% and preferably at least 80% of the particles stored in the inhaler receptacle is delivered to a subject's respiratory system in a single, breath-activated step. In another embodiment, at least 1 to 80 milligrams of L-Dopa is delivered by administering, in a single breath, to a subject's respiratory tract particles enclosed in the receptacle. Preferably at least 10 15, 20, 25, 30, 35, 40, 50, 60, 75 and 80 milligrams can also preferably be delivered.

Delivery to the pulmonary system of particles in a single, breath-actuated step is enhanced by employing particles which are dispersed at relatively low energies, such as, for example, at energies typically supplied by a subject's inhalation. Such energies are referred to herein as "low." As used herein, "low energy administration" refers to administration wherein the energy applied to disperse and/or inhale the particles is in the range typically supplied by a subject during inhaling.

The invention also is related to methods for efficiently delivering powder particles to the pulmonary system. For example, but not limited to, at least about 60%, preferably at least about 70% or preferably at least about 80% of the nominal powder dose is actually delivered.

In one embodiment, compositions used in this invention comprise particle such as dry powder particles suitable for pulmonary delivery comprising about 60-99% by weight (dry weight) of levodopa. Particularly preferred are particles that include about 75% by weight or more of levodopa and even more preferably comprise about 90% by weight or more of levodopa. Particles can consist entirely of L-Dopa or can further include one or more additional components. Examples of such suitable additional components include, but are not limited to, phospholipids, amino acids, sugars and salts. Specific examples of phospholipids include but are not limited to phosphatidylcholines dipalmitoyl phosphatidylcholine (DPPC), dipalmitoyl phosphatidylethanolamine (DPPE), distearoyl phosphatidylcholine (DSPC), dipalmitoyl phosphatidyl glycerol (DPPG) or any combination thereof. The amount of phospholipids, e.g., DPPC, present in the particles of the invention generally is less than 10 wt %.

Salts include a small amount of a strong electrolyte salt, such as, but not limited to, sodium chloride (NaCl). Other salts that can be employed include sodium citrate, sodium lactate, sodium phosphate, sodium fluoride, sodium sulfate and calcium carbonate. Generally, the amount of salt present in the particles is less than 10 wt %, for example, less than 5 wt %.

In one preferred embodiment, a formulation of levodopa suitable for pulmonary delivery to a patient by inhalation comprises, 90% by weight of levodopa, 8% by weight of dipalmitoyl phosphatidylcholine (DPPC) and 2% by weight sodium chloride and is referred to herein as "90/8/2".

In one embodiment, the methods of the invention provide rapid relief of motor fluctuations in a Parkinson's disease patient. The methods of the invention are particularly useful for treatment of motor fluctuations which arise as a result of poorly controlled levodopa plasma levels in a patient.

In one embodiment, the methods of the invention comprise pulmonary administration of levodopa by inhalation at therapeutically effective concentrations such that the patient's plasma levodopa concentration increases by at least about 200 ng/ml within 10 minutes or less post inhalation as compared to the concentration of levodopa in the patient's plasma prior to inhalation of the levodopa and wherein the patient's plasma concentration remains increased by at least about 200 ng/ml for a time period of at least 15 minutes after inhalation.

In one embodiment, the patient's plasma levodopa concentration maintains an increase of at least about 200 ng/ml for a time period of at least about 20 minutes after administration. In one embodiment, the patient's plasma levodopa concentration maintains said increase of at least about 200 ng/ml for a time period of at least about 30 minutes after administration. In one embodiment, the patient's plasma levodopa concentration maintains said increase of at least about 200 ng/ml for a time period of at least about 60 minutes after administration. In other embodiments, the increase is more than 200 ng/ml, 200 to 500 ng/ml, 300 to 400 ng/ml or 250 to 450 ng/ml. In one embodiment, the patient's plasma levodopa concentration does not increase more than about 1000 ng/ml within 10 minutes.

In one embodiment, a method of the invention provides rapid relief of motor fluctuations in a Parkinson's disease patient comprising administering about 20 mg to about 75 mg of levodopa to a patient by inhalation, wherein said patient receives immediate relief of motor fluctuations within 10 minutes of said inhalation, and wherein said patient maintains said relief for a period of at least 30 minutes.

In accordance with any of the methods of the invention, the area under the curve (AUC) of levodopa in the patient's plasma at about 10 minutes after administration of a dose of levodopa by inhalation is increased by at least about 1000 ng-min/ml for every 4 mg of levodopa administered as compared to the patient's plasma levodopa concentration prior to administration of levodopa by inhalation. In one embodiment, the AUC of said levodopa in the plasma at about 10 minutes after administration of a dose of levodopa by inhalation is increased by at least about 1000-1500 ng-min/ml for every 4 mg of levodopa administered as compared to the patient's plasma levodopa concentration prior to administration of levodopa by inhalation.

In accordance with any methods of the invention, within about 10 minutes of administration of a dose of levodopa by inhalation, the patient's plasma levodopa concentration increases by at least about 175 ng/ml for every 10 mg of levodopa delivered as compared to the patient's plasma levodopa concentration prior to administration of levodopa by inhalation, wherein said patient's plasma levodopa concentration maintains said increase of at least about 175 ng/ml for a time period of at least about 15 minutes, preferably about 20 minutes, preferably about 25 minutes, preferably about 30 minutes, preferably about 45 minutes or preferably about 60 minutes after administration.

In one embodiment the invention provides a method of providing rapid relief of motor fluctuations in a Parkinson's disease patient comprising administering about 20 mg to about 75 mg of levodopa to a patient by inhalation wherein the $Cmax^{Pul}/AUC^{Pul}$ divided by $Cmax^{Oral}/AUC^{Oral}$ is greater than 1 wherein the dose of levodopa given orally is relatively the same as the dose given via pulmonary delivery.

In one embodiment, the invention provides a method of providing rapid relief of motor fluctuations in a Parkinson's disease patient comprising administering one or more doses of levodopa by inhalation wherein the ratio of $T^{1/2}/T^{max}$ is less than ½ and preferably less than ⅕.

In one embodiment, the dose used in any of the methods of the invention comprises about 10 mg to about 75 mg of levodopa delivered to the patient. In one embodiment, the dose comprises about 12 mg to about 35 mg of levodopa. In one embodiment, the dose of levodopa comprises at least about 10 mg levodopa, preferably at least about 25 mg levodopa, preferably at least about 35 mg levodopa, preferably at least about 50 mg levodopa and preferably at least about 75 mg levodopa.

In one embodiment, the amount of levodopa delivered to the pulmonary system is about 25 to about 60 mg of levodopa after the inhalation of one or more capsules. In another embodiment, the amount of levodopa delivered to the pulmonary system is about 35 to 55 mg, about 30 to 50 mg, about 40 to 50 mg, about 45 to 55 mg after the inhalation of one or more capsules.

In some embodiments, the rapid motor relief or plasma increases of levodopa occur after in inhalation of the powder in one capsule of levodopa. In other embodiments, the rapid motor relief or plasma increases of levodopa occur after the inhalation of the powder in two, three, four or five capsules.

In one embodiment, the dose used in any of the methods of the invention contains a salt. In one embodiment, the dose contains a phospholipid.

In one embodiment, any of the methods of the invention further comprise co-administering a dopa decarboxylase inhibitor to the patient. In one embodiment, the dopa decarboxylase inhibitor is administered to the patient before administration of levodopa by inhalation, simultaneously with administration of levodopa by inhalation or after administration of levodopa by inhalation.

In one embodiment, any of the methods of the invention may further comprise administering an oral dosage of levodopa to said patient.

In one embodiment, any of the methods of the invention comprise maintaining relief of motor fluctuations for a period of at least 2 hours, preferably at least 3 hours, preferably at least 4 hours, preferably at least 5 hours and more preferably at least 6 hours or more.

In one embodiment the Parkinson's disease patient treated in accordance with any of the methods the invention is a stage 2, 3 or stage 4 Parkinson's disease patients.

In accordance with any methods of the invention, the dosages of levodopa are not affected by a central nervous system food effect.

In one preferred embodiment the dose of levodopa used in any of the methods of the inventions comprises 90% by weight levodopa, 8% by weight dipalmitoylphosphatidylcholine (DPPC) and 2% by weight of sodium chloride.

The administration of more than one dopamine precursor, DOPA decarboxylase inhibitor or combinations thereof, including, but not limited to, L-Dopa, carbidopa, apomorphine and benserazide can be provided, either simultaneously or sequentially in time to administration of levodopa by inhalation in accordance with the invention. In one embodiment the administration of more than one dopamine precursor or DOPA decarboxylase inhibitor can be administered by intramuscular, subcutaneous, oral and other administration routes. In one embodiment, these other agents are also co-administered via the pulmonary system. These compounds or compositions can be administered before, after or at the same time as pulmonary administration of levodopa by inhalation and are deemed to be "co-administered" when used in conjunction with administration of levodopa via inhalation in accordance with the methods described herein.

In one embodiment, the patient does not require the co-administration of a DOPA decarboxylase inhibitor or allows for a lower or less frequent dose of a DOPA decarboxylase inhibitor. In another embodiment, the patient does not require the co-administration of carbidopa or allows for a lower or less frequent dose of carbidopa as compared to a patient receiving L-Dopa orally. In a further embodiment, the patient does not require the co-administration of benserazide or allows for a lower or less frequent dose of benserazide as compared to a patient receiving L-Dopa orally. In one embodiment, relationship between reliance on carbidopa between levodopa administered through the pulmonary route and levodopa administered through the oral route is:

$$\frac{^{INN}C_{MAX}^{W/O\,CD}}{^{INN}C_{MAX}^{W\,CD}} \bigg/ \frac{^{ORAL}C_{MAX}^{W/O\,CD}}{^{ORAL}C_{MAX}^{W\,CD}}$$

where "w/o CD" means without carbidopa, "w/CD" means with carbidopa, "INN" refers to the pulmonary route, and oral refers to the oral route of levodopa delivery to the patient.

In one embodiment, a precise dose of levodopa is needed to turn a patient on. For example, on one embodiment, a dose of levodopa must increase the patient's plasma levodopa concentration by between about 200 ng/ml and 500 ng/ml. Interestingly, this small increase in levodopa concentration applies to a wide range of patient dosing schedules. A patient who may need to have a plasma level of 1500-2000 ng/ml of levodopa to be "on" can be turned on by 200-500 ng/ml of levodopa in the plasma while a patient who may need to have a plasma level of 500-1000 ng/ml of levodopa to be "on" can be turned on by 200-500 ng/ml of levodopa in the plasma. More specifically, a patient can be turned on by increasing the patient plasma concentration by 200-400 ng/ml, 250-450 ng/ml 300-400 ng/ml or about 375-425 ng/ml.

Increasing the patient's plasma concentration by 200-500 ng/ml can be done in a variety of ways. The patient can be given levodopa orally, through the pulmonary route or parentally. If given by the pulmonary route, a patient could be provided a dose of 25-50 mg of levodopa to the patient's pulmonary system. In one embodiment, the dose provided to the patient's pulmonary system could be 25-35 mg, 27-32 mg, 28-32 mg, 29-31 mg, or about 30 mg. Providing the dose to the patient's pulmonary system can be done in a variety of ways. In one embodiment a capsule is contains 35-40 mg of levodopa powder, said capsule provides 40-60% of the powder in the capsule to the patient's pulmonary system, and said powder comprises 75-98% levodopa.

The following Examples are intended to illustrate the invention but cannot be construed as limiting the scope thereof.

Example 1

Summary

A 90/8/2 dry powder levodopa formulation was provided to evaluate the safety, tolerability and levodopa pharmacokinetics (PK) following administration of 90/8/2 pulmonary levodopa powder compared with oral levodopa in adult healthy volunteers. The pulmonary levodopa powder described in these examples is comprised of particles of 90% levodopa, 8% dipalmitoylphosphatidylcholine and 2% sodium chloride, all by dry weight and is referred to herein as "90/8/2. This data provides a description of the PK of levodopa following single inhaled doses of 90/8/2 and a comparison to orally administered levodopa (LD) in the fasted or fed conditions as well as a comparison of the PK with and without pretreatment with carbidopa (CD). This was a two-part study in healthy adult male and female subjects as follows: Part A—Dose Escalation Segment with comparison to oral levodopa; and Part B—90/8/2 plus or minus a Carbidopa Pre-treatment Segment.

Part A was an open-label, 3-period crossover, single-ascending dose study. Each subject received a single oral dose of CD/LD (25/100 mg) in a fed or fasted state in one session, and two different doses of inhaled 90/8/2 (10 and 30 mg or 20 and 50 mg levodopa fine particle dose (FPD), in single ascending doses, in two different treatment sessions. Two groups of nine subjects each were enrolled.

Part B was an open-label, randomized, two-period, period balanced crossover study. Eight subjects underwent an evaluation of the safety, tolerability and levodopa PK following administration of a single inhaled 90/8/2 dose (40 mg levodopa FPD) with and without pre-treatment with CD.

Blood samples were collected over 24 hours and plasma levodopa concentrations were determined by Simbec Research Limited (UK) using a validated liquid chromatography-tandem mass spectrometry (LC-MS-MS) assay with a lower limit of quantitation of 9.84 ng/mL. Pharmacokinetic analysis was performed using non-compartmental methods followed by PK modeling using a two-compartment model with a lag time. 90/8/2 administered by inhalation at doses of 10 to 50 mg levodopa FPD produced rapidly increasing, dose-proportional plasma levodopa concentrations, achieving potentially therapeutically relevant levels within 5 to 10 minutes after fine particle doses of 20 to 50 mg in healthy adults.

Levodopa plasma concentrations following 90/8/2 inhalation increased faster than those following oral administration in the fasted condition and much faster than those under fed conditions. Exposure over the first ten minutes following drug administration expressed as the partial area under the plasma concentration versus time curve, AUC from 0 to 10 minutes ($AUC_{0-10m}$) and as the maximum plasma concentration observed over the first ten minutes post-dose ($C_{max, 10m}$) indicated much earlier systemic exposure following 90/8/2 inhalation compared to oral administration.

Subject to subject variability in plasma concentrations was greatly reduced with inhalation compared to oral administration and what would have been expected with pulmonary administration. The analysis also indicated that oral administration in the fasted state lead to more rapid absorption compared to the fed state but still much slower than following inhalation. Pharmacokinetic modeling indicated a lag time of approximately 9 to 10 minutes following oral administration in the fed or fasted state compared to a lag time of less than 0.5 minute following 90/8/2 inhalation. Furthermore, the absorption half-life was shorter following inhalation compared to oral administration.

Following 90/8/2 inhalation, systemic levodopa exposure was proportional to the 90/8/2 dose administered. Dose-normalized $C_{max}$ and AUC were very similar across the 90/8/2 doses administered. Dose-normalized (based on estimated fine particle dose) exposure following inhalation was 1.3 to 1.6 times greater based on AUC and 1.6 to 2.9 times greater based on $C_{max}$ compared to oral administration. As has been described in the literature, following oral administration, considerable reduction in $C_{max}$ and prolongation in $T_{max}$ was observed in fed subjects; however, AUC was similar between fed and fasted subjects.

Plasma concentrations from Part B of the study in which a 40 mg fine particle dose of 90/8/2 was inhaled with or without carbidopa pretreatment in a cross-over design demonstrated rapid absorption with plasma concentration achieving potentially therapeutic levels. Plasma levodopa clearance was approximately four-fold faster without CD pretreatment. Correspondingly, $C_{max}$ and AUC were lower and $T_{max}$ and $T_{1/2}$ were somewhat shorter without CD pretreatment. The main findings of this study were:

Inhaled 90/8/2 resulted in rapid increases in plasma levodopa concentrations;

Systemic exposure to levodopa based on $C_{max}$ and AUC was much greater over the first 10 minutes after dosing with 90/8/2 inhalation compared to oral drug administration;

Potentially therapeutically relevant levodopa plasma concentrations were achieved within 5 to 10 minutes after inhalation of fine particle doses of 20 to 50 mg in healthy adults;

Subject to subject variability in plasma levodopa concentrations was considerably less following inhalation compared to oral administration and what would have been expected with pulmonary administration;

Systemic levodopa exposure was proportional to levodopa fine particle dose administered;

Pharmacokinetic modeling indicated that inhaled 90/8/2 had much shorter lag times and faster absorption rates than oral administration;

Dose-normalized (based on estimated fine particle dose) exposure following inhalation was 1.3 to 1.6 times greater based on AUC and 1.6 to 2.9 times greater based on $C_{max}$ compared to oral administration;

Plasma levodopa clearance was approximately four-fold greater and levodopa exposure was reduced in the absence of carbidopa pre-treatment.

Introduction

In this example, 90/8/2 has been tested as an episodic treatment of motor fluctuations ("off episodes") in patients with Parkinson's disease who experience intermittent inadequate response to their standard oral medications. 90/8/2 may be used as an adjunct to the patient's existing dopadecarboxylase inhibitor (i.e., carbidopa or benserazide)-inclusive Parkinson's disease medication regimen. This study was the first study in humans with 90/8/2 and is designed to evaluate the safety, tolerability and levodopa pharmacokinetics (PK) following administration of 90/8/2 compared with oral levodopa in adult healthy volunteers.

Safety and tolerability results have been tested in clinical trials. This PK data analysis provides a description of the PK of levodopa following single inhaled doses of 90/8/2 and a comparison to orally administered levodopa (LD; L-Dopa) in the fasted or fed conditions as well as a comparison of the PK of levodopa with and without pretreatment with carbidopa (CD). Oral levodopa was administered as a routinely prescribed combined carbidopa/levodopa preparation.

Study Design and Objectives

This was a two-part study in healthy adult male and female subjects as follows:
 Part A: Dose Escalation Segment with comparison to oral levodopa.
 Part B: 90/8/2±Carbidopa Pre-treatment Segment.

The primary pharmacokinetic objective of Part A of the study was to investigate the pharmacokinetics of levodopa following administration of single, inhaled doses of 90/8/2 in healthy adults. Secondary objectives were to explore the dose proportionality of levodopa following single inhaled dose administration and to compare the PK of 90/8/2 to oral levodopa administered in the fasted state or fed state. The objective of Part B was to compare the tolerability and pharmacokinetics of 90/8/2 with and without pretreatment with carbidopa.

Part A was an open-label, 3-period crossover, single-ascending dose study. All subjects were treated with oral carbidopa one day prior to and on the day of study drug treatment. Each subject received a single oral dose of CD/LD (25/100 mg) in a fed or fasted state in one session, and two different inhaled doses of 90/8/2, in single ascending doses, in two different sessions. Two groups of nine subjects each were enrolled. The study design for Part A is outlined in Table 1 below:

TABLE 1

Part A Study Design.

| Group | N | Dose Group | Levodopa Dose* (mg) |
|---|---|---|---|
| 1 | 9 | Oral CD/LD Fed or Fasted | 100 |
|   |   | 90/8/2 Dose Level 1 | 10 |
|   |   | 90/8/2 Dose Level 3 | 30 |
| 2 | 9 | Oral CD/LD Fed or Fasted | 100 |
|   |   | 90/8/2 Dose Level 2 | 20 |
|   |   | 90/8/2 Dose Level 4 | 50 |

*Levodopa dose for 90/8/2 administration indicates estimated fine particle dose (FPD; i.e., 'lung-delivered' dose); oral CD/LD (25 mg/100 mg).

Part B was an open-label, two-period, period balanced crossover study. Following preliminary review of safety and PK data from Part A, eight subjects underwent an evaluation of the safety, tolerability and levodopa PK following administration of a single inhaled 90/8/2 dose (40 mg levodopa FPD) with and without pre-treatment with CD in a randomized, balanced fashion so that equal numbers of subjects received one of the two dosing sequences A→B or B→A, defined as follows:

Regimen A: 90/8/2 with CD pre-treatment

Regimen B: 90/8/2 without CD pre-treatment

Carbidopa treatments in Parts A and B of the study were standardized according to the schedule in Table 2.

In Part A, blood samples were collected pre-dose and following oral CD/LD administration at 10, 20, 30, 45, 60, 75, 90, 120 min, 4, 8, 16 and 24 h. During 90/8/2 inhalation treatment sessions in Parts A and B, samples were collected at the same times plus additional samples at 1, 2, and 5 minutes. Plasma levodopa concentrations were determined by Simbec Research Limited using a validated liquid chromatography-tandem mass spectrometry (LC-MS-MS) assay with a lower limit of quantitation of 9.84 ng/ml (2, 3).

TABLE 2

Carbidopa Treatment Schedule.

| | Carbidopa (LODOSYN ®) Dose and Timing | |
|---|---|---|
| Treatment Session | Day −1 | Day 1* |
| Oral CD/LD: Part A | 50 mg every 8 h prior to Day 1 dosing (0, 8 and 16 h, ≥1 h from the nearest meal)** | 25 mg*** 1 h pre-dose 50 mg 7 and 15 h post-dose |
| 90/8/2: Part A & Part B (+CD) | 50 mg every 8 h prior to Day 1 dosing (0, 8 and 16 h, ≥1 h from the nearest meal) | 50 mg 1 h pre-dose, 7 and 15 h post-dose |
| 90/8/2: Part B (−CD) | — | 50 mg 7 and 15 h post-dose |

*When an oral and inhaled dosing session were scheduled to occur over two consecutive days, the CD dosing regimen administered for the first dosing session adequately covered the CD pre-treatment required for the second dosing session. Subjects in Part A and Part B (+CD) received 3 doses of CD during the day before receipt of study medication.
**Does not apply to subjects randomized to fed state.
***Note:
25 mg carbidopa also administered at T0 as part of oral CD/LD administration Pharmacokinetic Analysis Methods Non-Compartmental Analysis Data analysis was performed on plasma concentrations and time for each subject and each treatment. Non-compartmental analysis was performed with WINNONLIN® professional version 5.3. The area under the curve from time zero to the last measureable time point ($AUC_{0-t}$) was estimated using the linear trapezoid method. Linear regression over the last three or more time points was used to estimate the elimination rate constant ($\lambda$) which was used to estimate terminal half-life ($T_{1/2}$) and AUC from zero to infinity ($AUC_{0-\infty}$) from the following equations:

$$T_{1/2} = \ln(2)/\lambda$$

$$AUC_{0-\infty} = AUC_{0-t} + C_t/\lambda$$

where $C_t$ is the last measureable concentration predicted by the regression line. Serum clearance divided by bioavailability (CL/F) and the apparent volume of distribution in the terminal phase divided by the bioavailability (Vz/F) were estimated from the equations below:

$$CL/F = Dose/AUC_{0-\infty}$$

$$Vz/F = Dose/(\lambda * AUC_{0-\infty})$$

the maximum concentration ($C_{max}$) and the time it was observed ($T_{max}$) were determined directly from the data.

The partial AUC over the first 10 minutes after drug administration ($AUC_{0-10m}$) was calculated by the trapezoid method. The maximum plasma concentration observed over the first 10 minutes ($C_{max,\ 10m}$) was determined as the highest plasma concentration observed from dosing up to an including the 10 minute sampling time. Inhalation-to-oral exposure ratios were calculated for each subject by dividing the dose-normalized $C_{max}$ or AUC following 90/8/2 inhalation by the dose-normalized parameter following oral administration. The exposure ratio based on AUC is the relative bioavailability of inhaled to oral drug.

An additional parameter, time to achieve half of the maximum observed plasma concentration, ($T_{Cmax50}$) was calculated (Microsoft Excel) by linear interpolation between the two time points with the plasma concentrations bracketing the plasma concentration calculated from $C_{max}$ divided by two.

Pharmacokinetic Modeling

Pharmacokinetic modeling was performed using WIN-NONLIN®, professional version 5.3. A number of different models were evaluated including one- and two-compartment models with and without lag times. All evaluated models had first order input. Models were evaluated based on a number of diagnostic criteria including the Aikaike Information Criterion, the sum of squared residuals, the relative values of the estimated parameters and their respective standard error estimates, the correlation of observed and predicted concentrations, and general trends in variation between predicted and observed concentrations.

Figure 9:
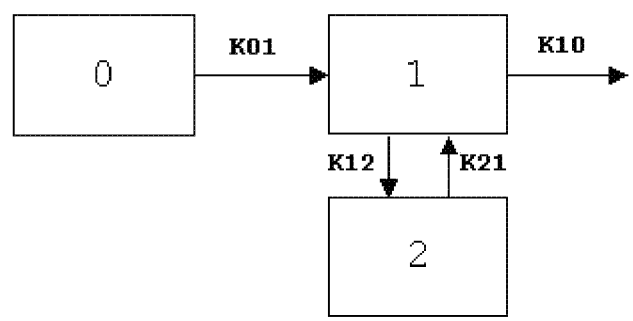
FIG. 9. Scheme of modeling using a two-compartment model.

The model that best described most of the plasma concentration versus time curves was a two-compartment model with a lag time (WINNONLIN® model 12). Most of the data sets from subjects receiving inhaled 90/8/2 were also well described by a model without a lag time because the estimated lag times from these subjects were very short, less than one minute in most cases. However, for comparison to data sets from oral administrations the lag time model was used for all subjects and all treatments. Most data sets were described better by a two-compartment model than a one-compartment model. In some cases, a one-compartment model could not be fit. For cases in which a one-compartment model was better, based on the statistical diagnostic criteria, the difference between the two models was very small. Therefore, the results of modeling using a two-compartment model are presented herein. The two-compartment model shown in FIG. 9 generates estimates for the volume of distribution divided by the fraction of dose absorbed (V/F), the lag time ($T_{lag}$), the rate constants associated with absorption and elimination, k01 and k10, respectively, and the inter-compartmental rate constants, k12 and k21. The rate constants associated with the distribution and elimination phases of the curve, $\alpha$ and $\beta$, are calculated from k12, k21, and k10. Other secondary parameters calculated from the primary parameters include AUC, $C_{max}$, $T_{max}$, CL/F, and the half-lives associated with the absorption, distribution and elimination phases of the curve ($T_{1/2k01}$, $T_{1/2\alpha}$, $T_{1/2\beta}$). The model is represented by the equation:

$$C_t = Ae^{-\alpha t} + Be^{-\beta t} + Ce^{-k01t}$$

$C_t$ is the plasma levodopa concentration at time t after administration, A, B and C are the y-axis intercepts of the distribution, elimination and absorption phases of the curve and are calculated from the dose, volume and rate constants. Uniform weighting was used in all analyses and plasma concentrations reported as below the level of quantitation of the assay (BLQ, <9.84 ng/mL) were treated as missing values. No data points were excluded from the analyses.

Results and Discussion

90/8/2 administered by inhalation at doses of 10 to 50 mg levodopa FPD produced rapidly increasing, dose-proportional plasma levodopa concentrations, achieving potentially therapeutically relevant levels (400 to 500 ng/mL) within 5 to 10 minutes after fine particle doses of 20 to 50 mg levodopa in healthy adults.

FIG. 1 presents the mean levodopa plasma levodopa concentrations following 90/8/2 inhalation and following a 100 mg oral dose under fed and fasted conditions. Individual values and concentration versus time plots were calculated for each inhaled dosage of 10 mg, 20 mg, 30 mg and 50 mg levodopa, respectively as well as 100 mg levodopa orally under fed and fasted conditions and with and without carbidopa pretreatment.

Figure 3:
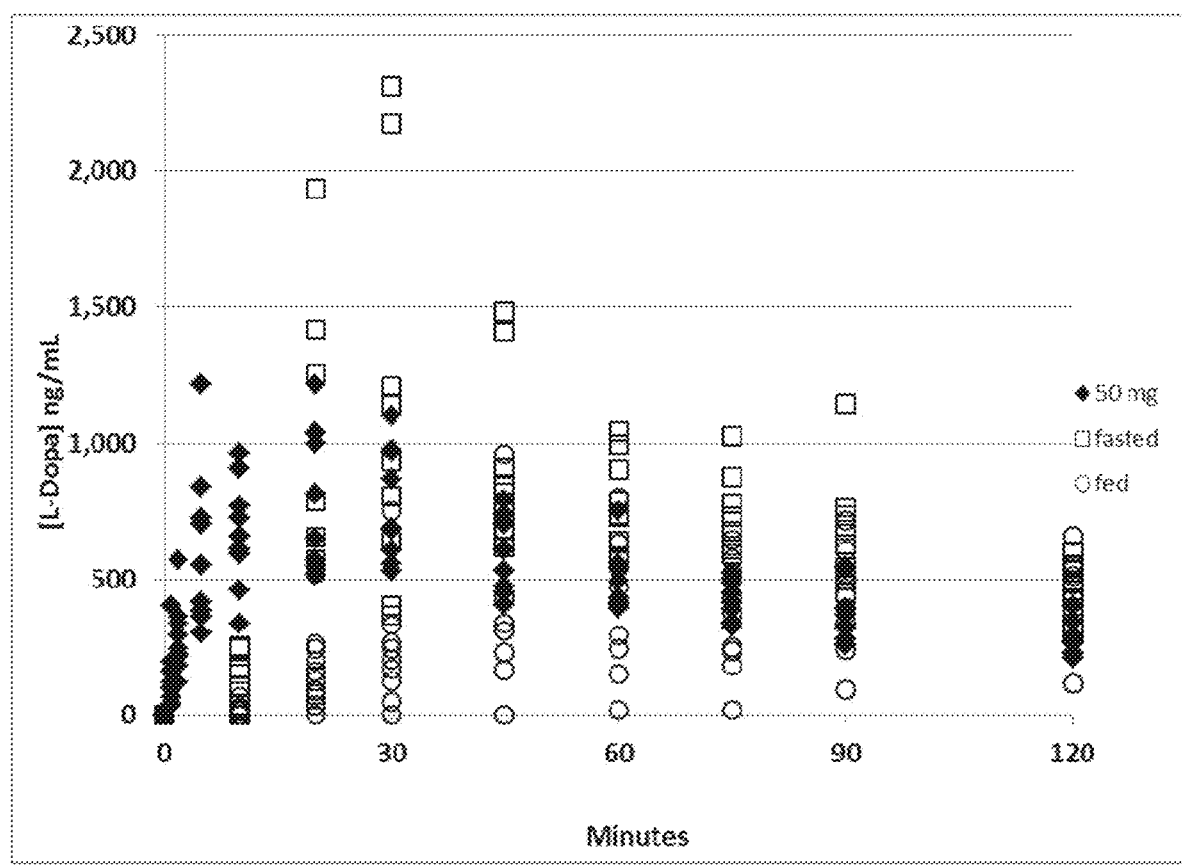
FIG. 3: Plasma levodopa concentrations in individual subjects following inhalation of 50 mg 90/8/2 or oral administration of 100 mg levodopa (CD/LD 25/100 mg) under fed and fasted conditions.

Plasma levodopa concentrations following 90/8/2 inhalation increased faster than those following oral administration in the fasted condition and much faster than those under fed conditions. Potentially therapeutically relevant plasma concentrations were achieved by approximately five minutes following 90/8/2 inhalation. Within five minutes of inhalation of 90/8/2, 20 to 50 mg FPD, plasma concentrations were 400 to 500 ng/ml or greater, a range that has been observed to be of potential therapeutic relevance (4). Plasma concentrations achieved following 90/8/2, 40 and 50 mg FPD were in the same range as those observed following oral CD/LD (25/100 mg) dosing (FIG. 3).

Figure 2:
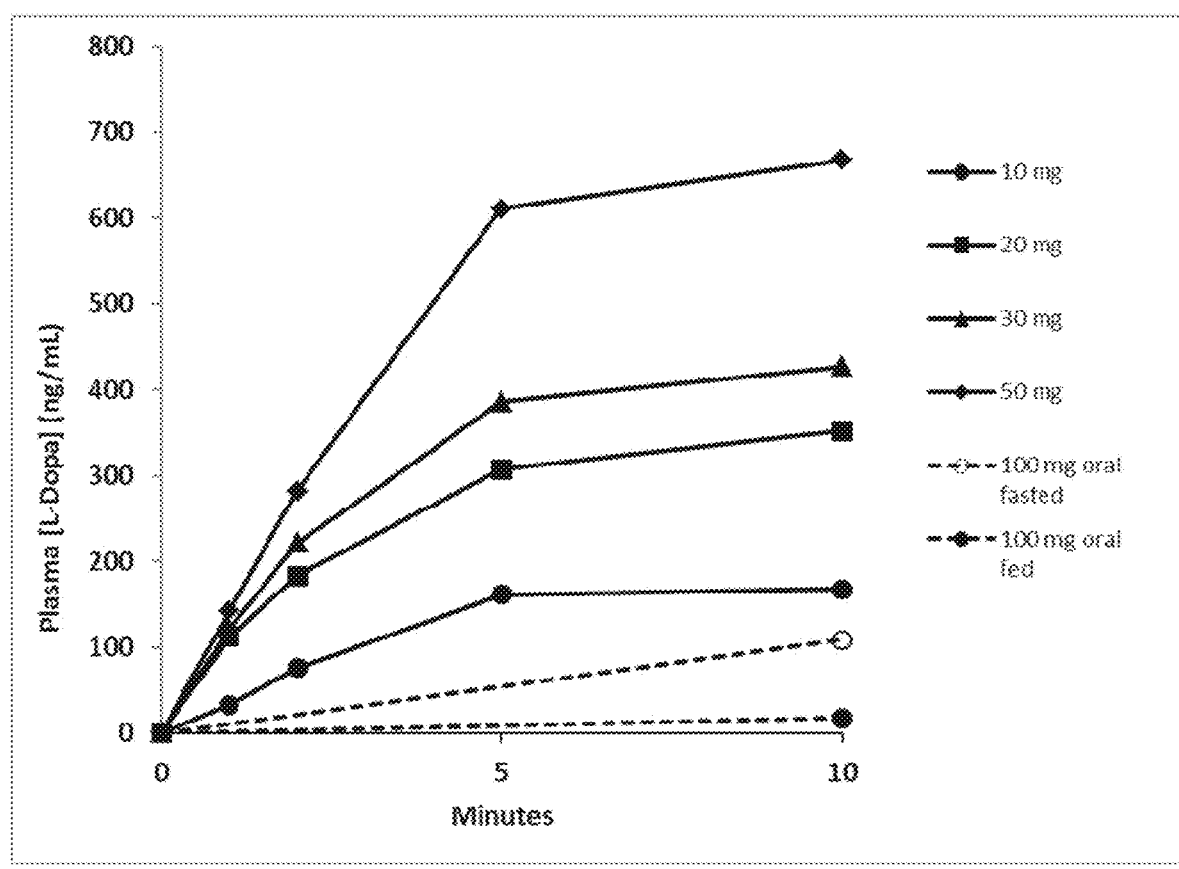
FIG. 2: Mean plasma levodopa concentration vs. time data following 90/8/2 inhalation compared to oral administration.

FIG. 2 shows the mean plasma concentrations over the first ten minutes compared to those following oral administration. Exposure over the first ten minutes following drug administration is expressed both as the AUC from 0 to 10 minutes ($AUC_{0-10m}$) and as the maximum plasma concentration observed over the first ten minutes ($C_{max,\ 10m}$) in Table 3. In some individuals the $C_{max,\ 10m}$ was observed in less than 10 minutes.

Oral administration in the fasted state lead to more rapid absorption compared to the fed state but still much slower than following inhalation. As has been described in the literature (5), following oral administration, considerable reduction in $C_{max}$ and prolongation in $T_{max}$ was observed in fed subjects; however, AUC (Table 5) was similar between fed and fasted subjects.

TABLE 3

Levodopa Exposure after 90/8/2 Inhalation or Oral Levodopa Administration.

| Dose (mg) | Mean ± SD $C_{max,\ 10\ m}$ (ng/mL) | Mean ± SD $AUC_{0-10\ m}$ (ng-min/mL) | Median $T_{Cmax50}$ min | Median $T_{max}$ min |
|---|---|---|---|---|
| 90/8/2 | | | | |
| 10 | 187 ± 58 | 1240 ± 391 | 3.08 | 10 |
| 20 | 368 ± 148 | 2590 ± 1283 | 2.64 | 10 |
| 30 | 456 ± 59 | 3176 ± 769 | 2.90 | 30 |
| 50 | 729 ± 265 | 4824 ± 1896 | 4.10 | 20 |
| Oral | | | | |
| 100 Oral fasted | 109 ± 99 | 561 ± 477 | 18.32 | 45 |
| 100 Oral fed | 18 ± 21 | 124 ± 95 | 39.84 | 120. |

Between-subject variability in plasma concentrations following treatment was much less following 90/8/2 inhalation than following oral administration. As seen in FIG. 3, following inhalation (filled symbols), plasma concentrations in most subjects receiving 50 mg 90/8/2 were above 400 ng/mL at 10 minutes after dosing, some were above 400 ng/mL at 5 minutes, and all by 20 minutes. Following oral administration (open symbols), the response was much slower with no subjects approaching 400 ng/mL within 10 minutes of dosing. Individual plasma concentration and variability data for other dose groups, indicate that at levodopa FPD doses of 20 mg and above plasma concentrations above 400 ng/mL were achieved in some subjects within 5 to 10 minutes of dosing and the responses were much less variable than following oral administration. The extent of variability expressed as the % CV in plasma concentrations within a treatment group at a given sampling time, shown in Table 4, demonstrates that within the first 30 minutes of dosing the variability in the 90/8/2 treated subjects was less than half that seen in the fasted oral group and approximately five-fold less than all oral subjects (fed and fasted combined).

TABLE 4

Variability in Plasma Levodopa Concentrations (% CV).

| | Minutes after Dosing | | | | | | | |
|---|---|---|---|---|---|---|---|---|
| | 10 | 20 | 30 | 45 | 60 | 75 | 90 | 120 |
| 90/8/2* | | | | | | | | |
| 10 mg | 31 | 43 | 42 | 29 | 28 | 25 | 26 | 20 |
| 20 mg | 43 | 39 | 35 | 26 | 27 | 31 | 35 | 24 |

TABLE 4-continued

Variability in Plasma Levodopa Concentrations (% CV).

| | Minutes after Dosing | | | | | | | |
|---|---|---|---|---|---|---|---|---|
| | 10 | 20 | 30 | 45 | 60 | 75 | 90 | 120 |
| 30 mg | 18 | 19 | 21 | 18 | 24 | 15 | 12 | 10 |
| 50 mg | 30 | 32 | 27 | 23 | 24 | 18 | 30 | 23 |
| Oral** | | | | | | | | |
| Oral (fasted) | 91 | 86 | 64 | 34 | 22 | 20 | 32 | 22 |
| Oral (all) | 132 | 117 | 101 | 62 | 48 | 47 | 42 | 27. |

*Refers to estimated levodopa fine particle dose
**Oral levodopa dose 100 mg

Figure 4:
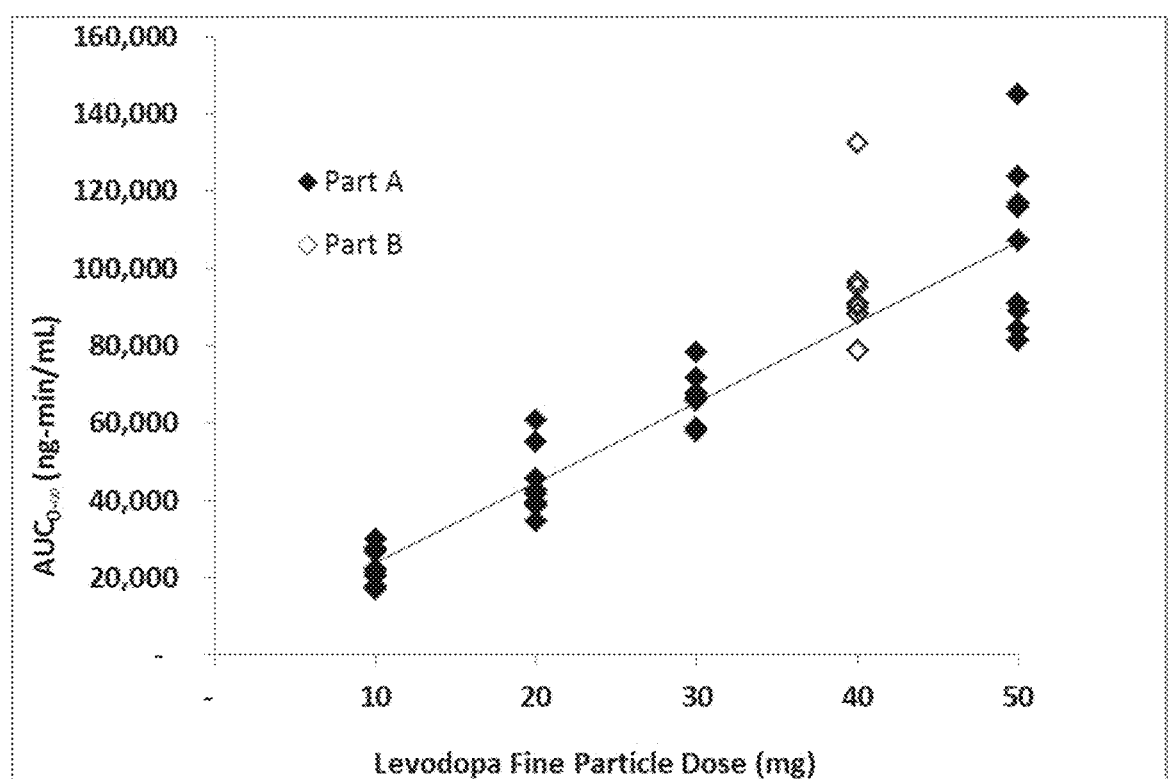
FIG. 4: Levodopa $AUC_{0-\infty}$ vs 90/8/2 fine particle dose.
Figure 5:
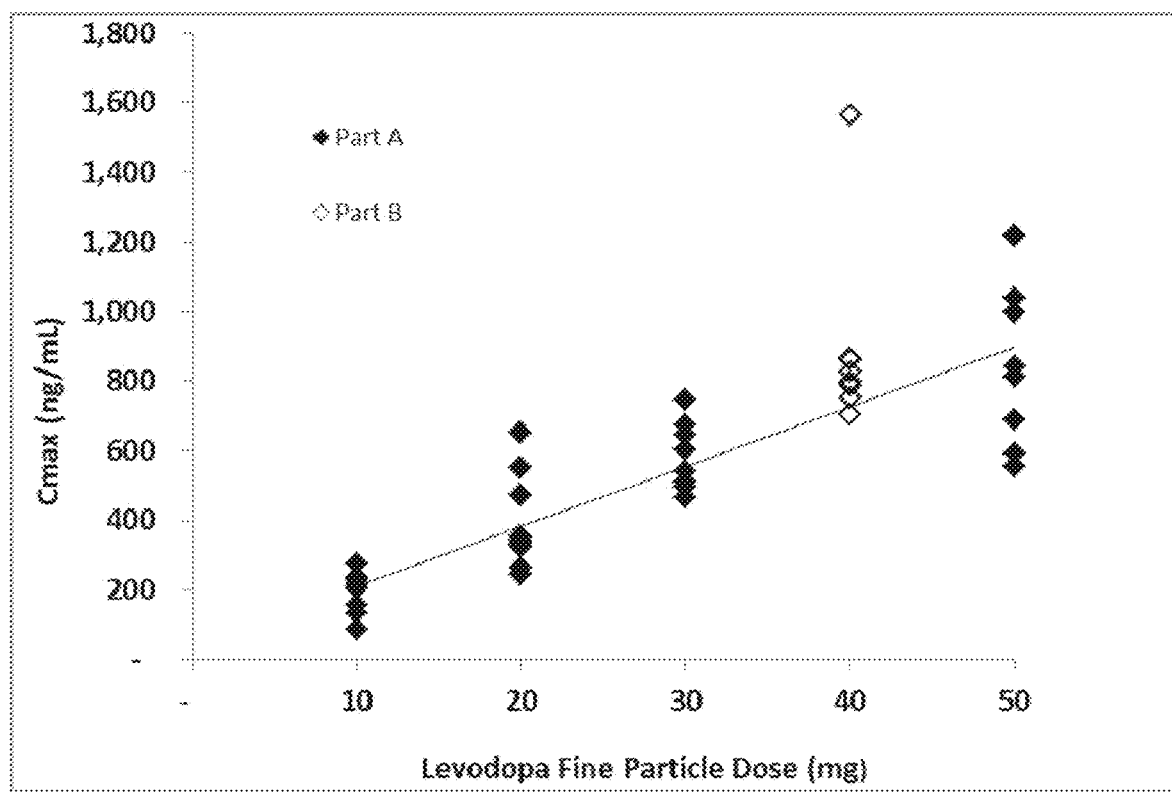
FIG. 5: Levodopa $C_{max}$ vs 90/8/2 fine particle dose.

A summary of the pharmacokinetic parameters estimated by non-compartmental analysis is shown in Table 5. Parameter estimates for individuals were determined from the non-compartmental PK analyses for each inhaled dosage of 10 mg, 20 mg, 30 mg and 50 mg as well as 100 mg oral dosage under fasted and fed conditions and with and without CD pretreatment. The results indicate that levodopa exposure was proportional to the 90/8/2 dose administered. Dose-normalized $C_{max}$ and AUC are very similar for all 90/8/2 doses. Dose proportionality is further illustrated in FIG. 4 and FIG. 5. $T_{1/2}$ is similar for all doses.

TABLE 5

Levodopa Pharmacokinetic Parameters (Mean ± SD) Estimated by Non-compartmental Analysis.

| Dose mg* | $C_{max}$ ng/mL | $C_{max}$/Dose ng/mL/mg | AUC ng-min/mL | AUC/Dose ng-min/mL/mg | $T_{1/2}$*** min |
|---|---|---|---|---|---|
| 90/8/2** | | | | | |
| 10 | 196 ± 60 | 19.60 ± 5.99 | 23,374 ± 4,656 | 2,337 ± 466 | 120 |
| 20 | 393 ± 137 | 19.67 ± 6.83 | 44,150 ± 8,504 | 2,208 ± 425 | 122 |
| 30 | 576 ± 95 | 19.19 ± 3.17 | 66,914 ± 6,185 | 2,230 ± 206 | 108 |
| 50 | 884 ± 249 | 17.69 ± 4.99 | 106,011 ± 21,234 | 2,120 ± 427 | 101 |
| Oral | | | | | |
| 100(fasted) | 1,317 ± 558 | 13.17 ± 5.58 | 156,598 ± 26,921 | 1,566 ± 269 | 101 |
| 100(fed) | 637 ± 144 | 6.37 ± 1.44 | 159,042 ± 30,544 | 1,590 ± 305 | 114. |

*Dose: levodopa dose
**Refers to estimated fine particle dose
***Median value

Bioavailability of inhaled 90/8/2 relative to oral levodopa was calculated for individual subjects from the ratios of the dose-normalized $AUC_{0-\infty}$. Since each subject in Part A of the study received one oral and two inhaled doses, two bioavailability estimates were determined for each subject, one for each inhaled dose. Relative exposure calculations were also performed on the dose-normalized $C_{max}$ values. Calculations were performed separately for oral doses administered under fed and fasted conditions. The means and standard deviations for the relative bioavailability calculations are presented in Table 6. Individual values were calculated as relative levodopa exposures following inhalation of 90/8/2 (10-50 mg levodopa fine particle dose) compared to carbidopa/levodopa 25/100 mg) oral administration calculated from the dose-normalized Cmax. There does not appear to be a major difference between fed and fasted subjects or among dose groups. Dose-normalized (based on estimated fine particle dose) exposure following inhalation was approximately 1.3 to 1.6 times greater based on AUC and 1.6 to 2.9 times greater based on $C_{max}$ compared to oral administration.

TABLE 6

Exposure Ratios (Mean ± SD) of Inhaled 90/8/2 Relative to Oral Levodopa

| 90/8/2 FPD | AUC | | $C_{max}$ | |
|---|---|---|---|---|
| mg | Oral Fasted | Oral Fed | Oral Fasted | Oral Fed |
| 10 | 1.61 ± 0.27 | 1.31 ± 0.37 | 1.72 ± 0.72 | 2.95 ± 1.47 |
| 20 | 1.50 ± 0.12 | 1.41 ± 0.23 | 1.96 ± 0.60 | 2.81 ± 1.04 |
| 30 | 1.47 ± 0.11 | 1.34 ± 0.34 | 1.65 ± 0.63 | 2.89 ± 0.29 |
| 50 | 1.35 ± 0.14 | 1.41 ± 0.24 | 1.57 ± 0.54 | 2.83 ± 1.02 |
| All | 1.49 ± 0.19 | 1.37 ± 0.27 | 1.72 ± 0.59 | 2.86 ± 0.95. |

Plasma concentration versus time profiles were best described by a two-compartment model with first order input and a lag time. Modeling was performed on individual data sets and observed and predicted concentration versus time plots were prepared using WINNONLIN® model 12. In some cases, estimates of the terminal half-life ($T_{1/2\beta}$) were very large due to a few points in the terminal phase of the curve having concentrations that were similar or fluctuating, resulting in a flat slope. In many of these cases the large $T_{1/2\beta}$ produced a very large estimate for AUC. Other variations in parameter estimates from the model caused a few aberrant values in some parameter estimates. These values were not excluded from the data analysis or treated statistically as outliers. Instead, data are summarized by the median value rather than the mean. Thus the unusually high or low values remain in the data presented but do not exert undue influence on the group summary statistics.

Pharmacokinetic modeling results shown in Table 7 indicate that there was a lag time of approximately nine minutes following oral administration. By comparison, the lag time associated with inhaled 90/8/2 was negligible, less than 0.5 minutes. Furthermore, the absorption rate of inhaled 90/8/2 was faster (shorter $T_{1/2k01}$) than that following oral administration in the fasted state and approximately ten-fold faster than absorption in the fed state. The much shorter lag time and faster absorption rate following 90/8/2 inhalation account for the greater systemic exposure observed within the first 5 to 10 minutes after dosing compared to oral administration. The calculated parameter, time to reach 50% of $C_{max}$ ($T_{Cmax50}$) also indicates that 90/8/2 inhalation produced earlier levodopa systemic exposure than oral administration. With the exception of oral administration in the fed state, absorption was much faster than elimination.

Figure 6:
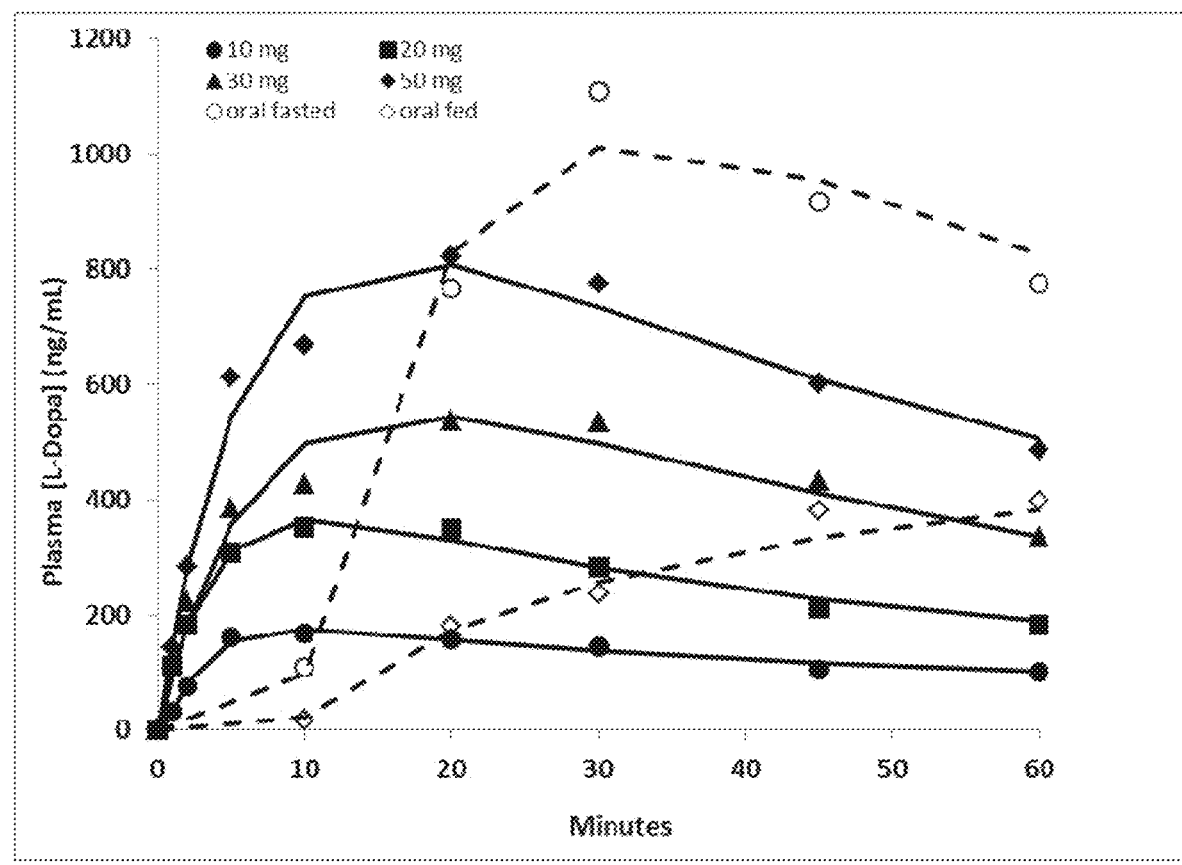
FIG. 6: Pharmacokinetic modeling of mean plasma concentrations. Symbols represent observed mean concentrations and lines represent concentrations predicted by the model.

The combined effects of the lag time and absorption rates on plasma concentrations in the first few minutes following administration is illustrated in FIG. 6 which presents pharmacokinetic modeling of mean plasma concentration data. This plot shows concentrations predicted by the pharmacokinetic model for 90/8/2 inhalation and oral levodopa administration over the first sixty minutes following dosing. The symbols represent observed mean concentrations and the lines represent concentrations predicted by the pharmacokinetic model. The good correlation of predicted and observed values indicates that the model describes the data very well. The figure also illustrates the other observations from the study that 90/8/2 inhalation results in rapid increases in plasma levodopa concentrations, potentially clinically relevant plasma concentrations can be achieved within 5 to 10 minutes of dosing, and exposure is dose-proportional.

TABLE 7

Pharmacokinetic Parameters (Median Values) Estimated by Pharmacokinetic Modeling

| Dose (mg) | $T_{lag}$(min) | $T_{1/2ko1}$(min) | $T_{1/2\alpha}$(min) | $T_{1/2\beta}$(min) |
|---|---|---|---|---|
| 90/8/2* | | | | |
| 10 | 0.21 | 4.31 | 8.18 | 180.33 |
| 20 | <0.01 | 3.53 | 11.54 | 135.04 |
| 30 | <0.01 | 5.47 | 33.38 | 167.66 |
| 50 | 0.29 | 7.37 | 26.12 | 142.46 |
| Oral | | | | |
| 100(fasted) | 9.41 | 9.96 | 9.64 | 132.40 |
| 100 (fed) | 9.78 | 65.39 | 7.49 | 98.21. |

*Refers to estimated fine particle dose

Part B

Figure 7:
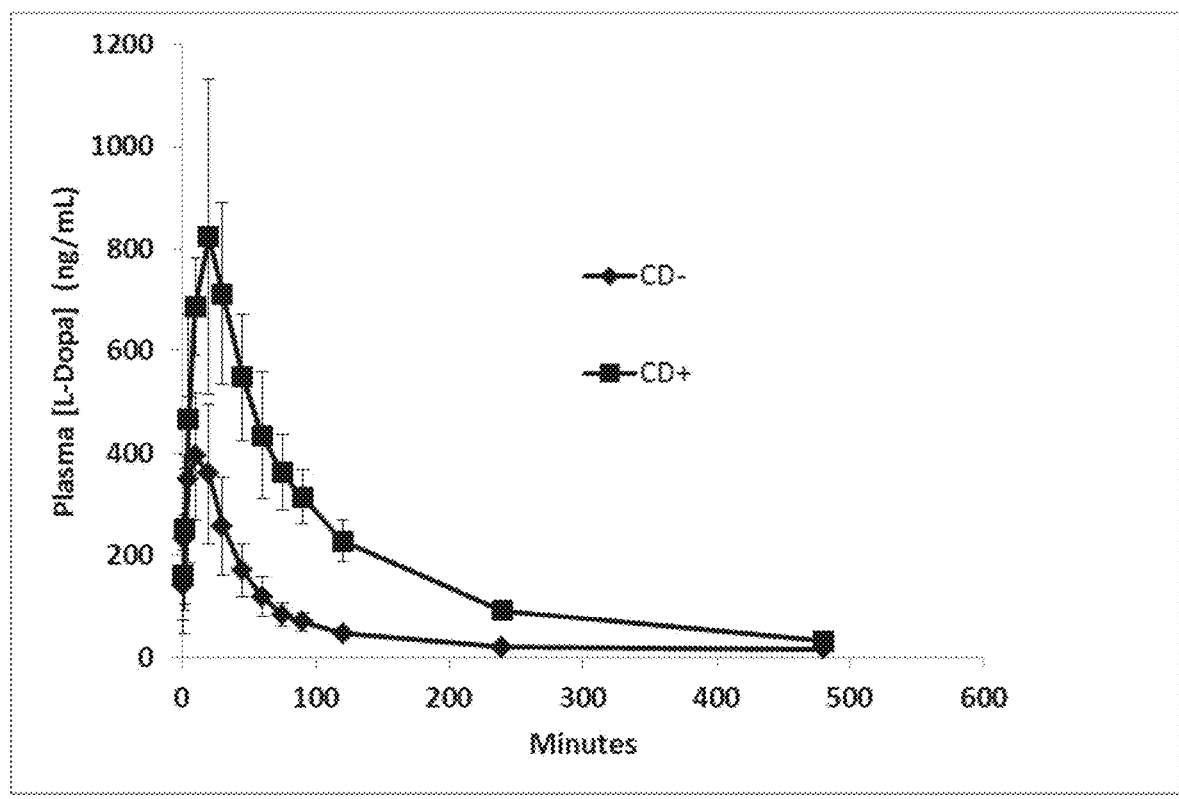
FIG. 7: Mean levodopa plasma concentrations with and without carbidopa (CD) pretreatment.

Plasma concentrations from Part B of the study in which 90/8/2, 40 mg levodopa FPD was inhaled with or without carbidopa pretreatment in a cross-over design are shown in FIG. 7. Peak plasma concentrations and exposure were higher with carbidopa pretreatment. Plasma levodopa clearance was approximately four-fold faster without CD pretreatment. Correspondingly, $C_{max}$ and AUC were lower and $T_{max}$ and $T_{1/2}$ were somewhat shorter without CD pretreatment (Table 8).

TABLE 8

Levodopa Pharmacokinetic Parameters (Mean ± SD) Estimated by Non-compartmental Analysis Following Inhalation of 40 mg 90/8/2 with and without Carbidopa Pretreatment.

| Treatment | $C_{max}$ ng/mL | $T_{max}$* min | $AUC_{0-\infty}$ ng-min/mL | CL/F mL/min | $T_{1/2}$* min |
|---|---|---|---|---|---|
| 40 mg with Carbidopa | 895 ± 276 | 20 | 95,058 ± 15,979 | 429 ± 59 | 113 |
| 40 mg without Carbidopa. | 423 ± 126 | 8 | 27,005 ± 8,756 | 1,619 ± 504 | 85 |

*Median value

Conclusions

The main findings of this study were: (i) that inhaled 90/8/2 resulted in rapid increases in plasma levodopa concentrations; (ii) Systemic exposure to levodopa based on $C_{max}$ and AUC was much greater over the first 10 minutes after dosing with 90/8/2 inhalation compared to oral drug administration; (iii) Potentially therapeutically relevant plasma levodopa concentrations were achieved within 5 to 10 minutes after 90/8/2 doses of 20 to 50 mg levodopa fine particle dose in healthy adults; (iv) Subject to subject variability in plasma levodopa concentrations was considerably less following inhalation compared to oral administration; (v) Systemic levodopa exposure was proportional to levodopa fine particle dose administered; (vi) Pharmacokinetic modeling indicated that inhaled 90/8/2 had much shorter lag times and faster absorption rates than oral administration; vii) Dose-normalized (based on estimated fine particle dose) exposure following inhalation was 1.3 to 1.6 times greater based on AUC and 1.6 to 2.9 times greater based on $C_{max}$ compared to oral administration; and viii) Plasma levodopa clearance was approximately four-fold greater and levodopa exposure was reduced in the absence of carbidopa pre-treatment.

Example 2

A Phase 2 study testing two doses of pulmonary levodopa (25 mg and 50 mg of study drug) was a multicenter, randomized, double blind, placebo-controlled, single dose, cross-over design with three arms (placebo, 25 mg and 50 mg) and included an "open label" oral Sinemet arm. The twenty four (24) patients treated in this study underwent serial evaluations of L-dopa plasma levels, motor response, and safety at each visit. The patients were administered the study drug in the OFF state with the serial evaluations starting prior to dosing and continuing for up to 180 minutes post-dose. Motor function was measured using a tapping test, the Unified Parkinson's Disease Rating Scale Part III (UPDRS III), and subjective evaluation of "meaningful" ON and OFF. Safety parameters monitored included pulmonary function, clinical laboratory data, EGCs, and vital signs (blood pressure, heart rate, and orthostatic blood pressure). This study was designed to measure the time, magnitude, and durability of pulmonary levodopa's effect on motor function, to evaluate the safety and tolerability of pulmonary levodopa in Parkinson's disease patients.

Figure 8:
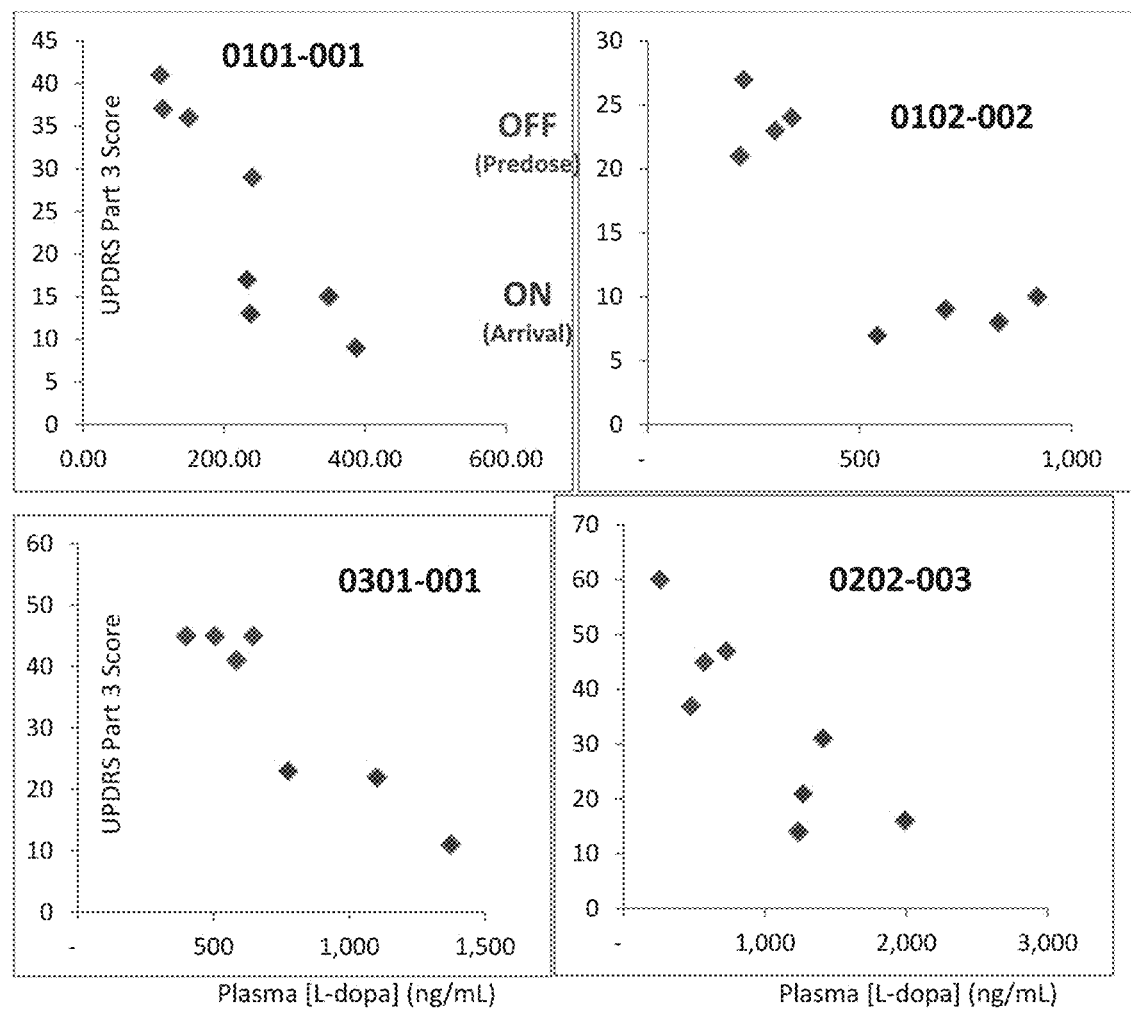
FIG. 8: Patients plasma levodopa concentrations are being compared to UPDRS scores.

In a comparison of pharmacokinetic parameters to pharmacodynamic parameters, the inventors discovered a surprisingly steep curve between patient's being in the off state and patients being in the on state. In FIG. 8, patient's plasma levodopa concentrations are being compared to UPDRS scores. UPDRS is a standard test for Parkinson's disease patients to test their response to drug treatment and their disease progression. As can be seen from FIG. 8, there is a very small levodopa plasma concentration difference between a patient being on and a patient being off. As little as 200-400 ng/ml of levodopa plasma concentration makes the difference between being in the off state and being in the on state. What is really striking is that of the four different patients shown here, they all have significantly different baseline plasma concentrations of levodopa. The different baseline levels of levodopa plasma relate to the fact that each patient has a different effective dose or effective concentration for the levodopa to have an effect on each patient. Despite the different effective doses or effective concentrations among a patient population, the increase in plasma concentration needed to go from off to on is very small.

The patent and scientific literature referred to herein establishes the knowledge that is available to those with skill in the art. All United States patents and published or unpublished United States patent applications cited herein are incorporated by reference. All published foreign patents and patent applications cited herein are hereby incorporated by reference. All other published references, documents, manuscripts and scientific literature cited herein are hereby incorporated by reference.

While this invention has been particularly shown and described with references to preferred embodiments thereof, it will be understood by those skilled in the art that various changes in form and details may be made therein without departing from the scope of the invention encompassed by the appended claims. It should also be understood that the embodiments described herein are not mutually exclusive and that features from the various embodiments may be combined in whole or in part in accordance with the invention.

What is claimed is:

1. A method of providing rapid relief of motor fluctuations in a Parkinson's disease patient comprising:
   administering at least one fine particle dose (FPD) of 20 mg to 50 mg of levodopa by inhalation to a Parkinson's disease patient, said FPD comprising 90% by dry weight levodopa, 8% by dry weight dipalmitoyl phosphatidylcholine (DPPC) and 2% by dry weight sodium chloride and the particles of the FPD having an aerodynamic diameter of less than 5.6 µm;
   wherein within about 10 minutes of administration of levodopa by inhalation, the patient's plasma levodopa concentration increases by at least about 200 ng/ml but no more than about 1000 ng/ml as compared to the patient's plasma levodopa concentration prior to administration; and
   wherein said patient's plasma levodopa concentration maintains said increase of at least about 200 ng/ml for a time period of at least about 15 minutes after administration.

2. The method of claim 1, wherein said Parkinson's disease patient is a stage 2, 3 or stage 4 Parkinson's disease patient.

3. The method of claim 1, wherein said dosages of levodopa are not affected by a central nervous system food effect.

4. The method of claim 1, wherein the patient's plasma levodopa concentration increases by at least 200 ng/ml for every 10 mg of levodopa delivered as compared to the patient's plasma levodopa concentration prior to administration of levodopa by inhalation.

5. The method of claim 1, wherein the method further comprises co-administering a dopa decarboxylase inhibitor to the patient, optionally wherein the dopa decarboxylase inhibitor is administered to the patient before, simultaneously with or after, administration of levodopa by inhalation.

6. The method of claim 4, wherein the method further comprises co-administering a dopa decarboxylase inhibitor to the patient, optionally wherein the dopa decarboxylase inhibitor is administered to the patient before, simultaneously with or after, administration of levodopa by inhalation.

7. The method of claim 1, wherein the patient's plasma levodopa concentration maintains said increase of at least about 200 ng/ml for a time period of at least 20 minutes after administration, at least 30 minutes after administration or at least 60 minutes after administration.

8. The method of claim 4, wherein the patient's plasma levodopa concentration maintains said increase of at least about 200 ng/ml for a time period of at least 20 minutes after administration, at least 30 minutes after administration or at least 60 minutes after administration.

9. The method of claim 1, wherein said patient's plasma levodopa concentration does not increase more than 1000 ng/ml within 10 minutes.

10. The method of claim 4, wherein said patient's plasma levodopa concentration does not increase more than 1000 ng/ml within 10 minutes.

11. The method of claim 1, wherein the patient's plasma levodopa levels increase by 200-500 ng/ml.

12. The method of claim 11, wherein said plasma levodopa levels are increased by 200-400 ng/ml, 300-400 ng/ml, 350-450 ng/ml or 400 ng/ml.

13. The method of claim 11, wherein said patient has at least a 100% improvement in UPDRS score within 20 minutes of administering said levodopa.

14. The method of claim 1, wherein said patient receives immediate relief of motor fluctuations within 10 minutes of said inhalation; and wherein said patient maintains said relief for a period of at least 30 minutes.

15. The method of claim 14, further comprising administering an oral dosage of levodopa to said patient.

16. The method of claim 14, wherein said relief of motor fluctuations is maintained for a period of at least 4 hours.

17. The method of claim 1, wherein the ratio of $T^{1/2}/T^{max}$ is less than ½.

18. The method of claim 17, wherein said ratio is less than ⅕.

* * * * *